United States Patent
Malouin et al.

(10) Patent No.: US 7,983,573 B2
(45) Date of Patent: *Jul. 19, 2011

(54) OPTICAL RECEIVER HAVING FSR PHASE COMPENSATION

(75) Inventors: Christian Malouin, San Jose, CA (US);
Theodore J. Schmidt, Gilroy, CA (US);
Brian L. Heffner, Los Altos, CA (US)

(73) Assignee: Opnext Subsystems, Inc., Los Gatos, CA (US)

( * ) Notice: Subject to any disclaimer, the term of this patent is extended or adjusted under 35 U.S.C. 154(b) by 892 days.

This patent is subject to a terminal disclaimer.

(21) Appl. No.: 11/724,017

(22) Filed: Mar. 14, 2007

(65) Prior Publication Data
US 2008/0231941 A1    Sep. 25, 2008

(51) Int. Cl.
*H04B 10/06* (2006.01)

(52) U.S. Cl. ........ 398/202; 398/188; 398/212; 398/213; 359/237; 359/325; 385/1; 385/11; 385/14; 385/27

(58) Field of Classification Search ........ 398/202, 398/208, 209, 210, 203, 204, 183, 188, 27, 398/25, 26, 189, 205, 206, 214, 161, 162, 398/212, 213; 359/237, 288, 325; 385/1, 385/11, 14, 15, 27
See application file for complete search history.

(56) References Cited

U.S. PATENT DOCUMENTS

| | | | |
|---|---|---|---|
| 6,587,204 B2 | 7/2003 | Hsieh | |
| 6,867,852 B2 * | 3/2005 | Hunsche | 356/73.1 |
| 6,911,645 B2 * | 6/2005 | Beger et al. | 250/227.19 |
| 7,233,430 B2 * | 6/2007 | Caplan | 359/325 |
| 7,266,311 B2 * | 9/2007 | Haunstein et al. | 398/209 |
| 7,324,713 B2 * | 1/2008 | Jang et al. | 385/1 |
| 7,411,725 B2 | 8/2008 | Suzuki et al. | |
| 7,460,793 B2 | 12/2008 | Taylor | |
| 7,477,848 B2 | 1/2009 | Ooi et al. | |
| 7,477,852 B2 * | 1/2009 | Agarwal et al. | 398/210 |
| 7,613,403 B2 * | 11/2009 | Hironishi et al. | 398/205 |
| 2004/0131109 A1 | 7/2004 | Kim et al. | |
| 2004/0258423 A1 | 12/2004 | Winzer | |
| 2005/0135518 A1 | 6/2005 | Vallet et al. | |
| 2006/0115029 A1 | 6/2006 | Marrow | |

(Continued)

FOREIGN PATENT DOCUMENTS

EP    1 686 709    8/2006

OTHER PUBLICATIONS

Agarwal, Chandrasekhar & Winzer, "Experimental Study of Photocurrent Imbalance in a 42.7-Gb/s DPSK Receiver under Strong Optical Filtering", Optical Society of America, Washington, D.C., Optical Fiber Communications Conference 2005, Technical Digest, OFC/NFOEC, vol. 5, Mar. 6-11, 2005, pp. 3 pp. vol. 6.

(Continued)

*Primary Examiner* — Hanh Phan
(74) *Attorney, Agent, or Firm* — Fish & Richardson P.C.

(57) ABSTRACT

An optical receiver apparatus and methods for mitigating intersymbol interference (ISI) in a differentially-encoded modulation transmission system by controlling constructive and destructive transfer functions. The receiver includes a bandwidth control element for controlling transfer function bandwidth, a transfer phase controller for controlling transfer function phase and/or an imbalancer for imbalancing the transfer functions for compensating for intersymbol interference and optimizing the quality of the received optical signal.

38 Claims, 13 Drawing Sheets

U.S. PATENT DOCUMENTS

| | | |
|---|---|---|
| 2006/0274320 A1 | 12/2006 | Caplan |
| 2007/0196110 A1 | 8/2007 | Mikkelsen et al. |
| 2008/0225380 A1 | 9/2008 | Heffner et al. |
| 2008/0225381 A1 | 9/2008 | Heffner et al. |
| 2008/0226306 A1 | 9/2008 | Heffner et al. |
| 2008/0232821 A1 | 9/2008 | Malouin et al. |
| 2009/0116851 A1* | 5/2009 | Heffner et al. ............... 398/208 |
| 2010/0111540 A1 | 5/2010 | Caplan et al. |

OTHER PUBLICATIONS

Mikkelsen, Rasmussen, Mamyshev & Liu, "Partial DPSK with excellent filter tolerance and OSNR sensitivity", Electronics Letters, Nov. 9, 2006, vol. 42, No. 23.

Domash, "Tunable Thin Film Filters Using Thermo-Optic Silicon", Aegis Semiconductors, Inc., Woburn, MA, year 2004, Optical Society of America, Washington, D.C.

Malouin, Bennike & Schmidt, "DPSK Receiver Design—Optical Filtering Considerations", Optical Society of America, Washington, D.C., Optical Fiber Communication Conference and Exposition and The National Fiber Optic Engineers Conference, OFC/NFOEC 2007, Anaheim, California, Mar. 25-29, 2007.

Hsieh, Ai, Chen, Liu, Gnauck & Wei "Athermal Demodulator for 42.7 Gb/s DPSK Signals", Optical Communication, 2005, ECOC, 31st European Conference on, vol. 4, Sep. 25-29, 2005, pp. 827-828 vol. 4.

Dingel & Izutsu, "Multifunction optical filter with a Michelson-Gires-Tournois interferometer for wavelength-division-mutiplexed network systems applications", Optical Society of America, Optics Letters, Jul. 15, 1998, vol. 23, No. 14, pp. 1099-1101.

Liu, Gnauck, Wei, Hsieh, Ai & Chien "Athermal Optical Demodulator for OC-768 DPSK and RZ-DPSK Signals", IEEE Photonics Technology Letters, vol. 17, No. 12, pp. 2610-2612,Dec. 2005.

Betti, S., et al., "A Novel Multilevel Coherent Optical System: 4-Quadrature Signaling," *Journal of Lightwave Technology*, 9(4):514-523, Apr. 1991.

Derr, F., "Coherent Optical QPSK Intradyne System: Concept and Digital Receiver Realization," *Journal of Lightwave Technology*, 10(9):1290-1296, Sep. 1992.

Kahn, J.M., et al., "Heterodyne Detection of 310-Mb/s Quadriphase-Shift Keying Using Fourth-Power Optical Phase-Locked Loop," *IEEE Photonics Technology Letters*, 4(12):1397-1400, Dec. 1992.

Yoshikane, N., et al., "Benefit of Half-Bit Delay Demodulation for Severely Bandlimited RZ-DPSK Signal," *Proceedings ECOC-IOOC 2003 Conference*, vol. 3, pp. 522-523, Sep. 2003.

International Search Report and Written Opinion dated Aug. 18, 2008 for International Application No. PCT/US2008/057157, filed Mar. 14, 2008 (8 pages).

Non-Final Office Action in U.S. Appl. No. 11/935,345 mailed Jun. 28, 2010, 14 pages.

Non-Final Office Action in U.S. Appl. No. 11/726,557 mailed Oct. 27, 2010, 27 pages.

\* cited by examiner

OPTICAL RECEIVER HAVING FSR PHASE COMPENSATION

BACKGROUND OF THE INVENTION

1. Field of the Invention

The present invention relates to apparatus and methods for adjusting constructive and destructive transfer functions of a differentially encoded phase shift keyed receiver for reducing inter-symbol interference in optical systems.

2. Description of the Prior Art

For an optical system with filters, the effective concatenated bandwidth of the filters induces intersymbol interference (ISI). The ISI causes distortion of the signal and reduces the decision quality (the ability to accurately detect if a bit is a logical "1" or "0") at a receiver. This decision quality may be quantified by counting the number of error bits and dividing it by the total number of transmitted bits. The resulting ratio is called bit error ratio (BER). Another way of discussing the quality of the signal at the receiver involves translating the BER to a parameter called Q using the equation $Q=20 \log \lfloor \sqrt{2} \text{erfc}^{-1}(2 \text{ BER}) \rfloor$ where $\text{erfc}^{-1}$ is the inverse complementary error function. The distortion effect of ISI on signal quality may be viewed in a general way in a baseband eye diagram of the modulated signal where ISI causes the space between "1" and "0" symbol levels to be partially filled by the trailing and leading edges of the symbols.

Optical signals commonly use binary phase shift keyed (BPSK) modulation where data bits for logical "0" and "1" by modulating a carrier with a phase shifts of 0 and $\pi$ radians. The logical "0" or "1" is decoded at the receiver by determining whether the detected signal is to the left or right of a vertical imaginary axis of a signal vector diagram, sometimes called an IQ diagram. A detector viewed as a polar detector determines whether the absolute value of the received phase is greater than $\pi/2$ for "0" and less than $\pi/2$ for "1". A detector viewed as a rectangular detector determines whether the cosine of the phase of the signal is negative or positive for "0" or "1".

The BPSK optical signals may use a differentially-encoded phase shift keyed (DeBPSK, or DPSK) modulation format. The DPSK modulation format encodes input data as the difference between two consecutive transmitted symbols. The input data is differentially pre-coded using the preceding symbol as a reference with an electrical "delay+add" function so that an input data bit of logical "0" or "1" is encoded as a change of carrier phase of 0 or $\pi$ radians relative to the preceding bit. At the detector the process is reversed by comparing a current bit to the preceding bit.

The DPSK decoding function may be performed using a delay line interferometer (DLI) and a balanced detector. The interferometer works on the principle that two waves that coincide with the same phase will add to each other while two waves that have opposite phases will tend to cancel each other. The interferometer has an input port for receiving the optical signal and two output ports—a constructive output port for issuing the waves that add and a destructive output for issuing the waves that tend to cancel.

The delay line interferometer (DLI) for DPSK signals has an additional element of an internal delay difference between the two waves that is about equal to the symbol time T of the DPSK modulation. The constructive output port issues a signal $Ec=E(t)+E(t-T)$ and the destructive output port issues a signal $Ed=E(t)-E(t-T)$. The effect of the time T is to reverse the signals at the two output ports so that the waves add at the destructive output port and cancel at the constructive output port when consecutive bits differ by $\pi$ radians. The difference between Ec and Ed can be detected with a direct detection intensity receiver to determine when there is a change in phase in the signal between two consecutive bits and thereby estimate the logical bits carried by the DPSK modulation.

It is an effect of this delay difference to impose a transfer function having a sinusoidal amplitude response (in the frequency domain) from the input port to each output port. The spectral period of a cycle of the transfer function, equal to 1/T, is termed the free spectral range (FSR). The sinusoidal width proportional to the FSR effectively limits the frequency band of the signals that can be passed from the DLI input to the constructive and destructive outputs. The phase of the frequency domain cycle of the transfer function is termed the FSR phase.

It is commonly believed that a DLI delay difference equal to the symbol time T, and an FSR equal to the inverse of the symbol time T, is desired in order to provide the best system performance (fewest data estimation errors) by maximizing the difference between the signals Ec and Ed at the constructive and destructive outputs. Considered by itself, a differential delay not equal to the symbol time T would be expected to degrade system performance because the current and preceding symbols are not exactly differentially compared.

SUMMARY OF THE INVENTION

The present invention provides an optical receiver and methods for mitigating intersymbol interference (ISI) in a differentially-encoded modulation transmission system by controlling constructive and destructive transfer functions.

Briefly, an optical receiver of the present invention includes a signal processor having constructive and destructive transfer functions for receiving and demodulating an optical signal having differential modulation. In a preferred embodiment the signal processor includes a delay line interferometer (DLI), a free spectral range (FSR) phase controller, and a gain imbalancer. The DLI has a transit time difference Y between two signal paths for demodulating the differential modulation signal and defining a free spectral range (FSR) bandwidth of constructive and destructive transfer functions. The FSR is calculated or adjusted so that the performance benefit obtained by controlling the transfer functions for reducing ISI distortion is greater than the performance that is lost by not maximizing the demodulated signals at constructive and destructive outputs when the time difference Y is not equal to the symbol time of the modulated signal. The FSR phase controller adjusts the phases of the constructive and destructive transfer functions to tune the FSR transfer functions relative to the carrier of the modulated optical signal. The gain imbalancer applies a calculated or adjusted unequal gain to the signals in the constructive and destructive paths for determining or modifying the constructive and destructive transfer functions.

In a preferred embodiment, the present invention is an optical receiver, comprising: a signal processor having constructive and destructive transfer functions for receiving a modulated optical input signal and issuing signals at constructive and destructive outputs, respectively; at least one transfer phase element disposed in the signal processor, the transfer phase element for providing a controllable transfer function phase for at least one of the transfer functions with respect to a frequency of the input signal; and a transfer phase controller coupled to the transfer phase element for controlling the transfer function phase for maximizing a difference between signal powers for the constructive and destructive outputs.

In another preferred embodiment, the present invention is a method for receiving an optical signal, comprising: applying constructive and destructive transfer functions to a modulated optical input signal for providing signals at constructive and destructive outputs, respectively, at least one of the transfer functions having a controllable transfer function phase; and controlling the transfer function phase with respect to a frequency of the optical signal for maximizing a difference between signal powers for the constructive and destructive outputs.

In another preferred embodiment, the present invention is an optical receiver, comprising: a signal processor having constructive and destructive transfer functions for processing a modulated optical input signal for providing signals at constructive and destructive outputs, respectively, at least one of the constructive and destructive transfer functions having a controllable bandwidth; and a bandwidth control element disposed in the signal processor for selecting the bandwidth based on an effective bandwidth of the input signal for compensating for signal impairments in the input signal.

In another preferred embodiment, the present invention is a method for receiving a modulated optical signal, comprising: processing a modulated optical input signal according to constructive and destructive transfer functions for issuing signals at constructive and destructive outputs, respectively, at least one of the constructive and destructive transfer functions having a controllable bandwidth; and controlling the bandwidth based on an effective bandwidth of the input signal for compensating for signal impairments in the input signal.

In another preferred embodiment, the present invention is an optical receiver for receiving a modulated optical signal, comprising: a signal processor for separating a modulated optical input signal into constructive and destructive signal paths; and an optical gain imbalancer disposed in at least one of the signal paths for selecting an optical gain imbalance between the signal paths based on an effective bandwidth of the input signal for compensating for signal impairments in the input signal.

In another preferred embodiment, the present invention is a method of receiving a modulated optical signal, comprising: separating a modulated optical input signal into optical constructive and destructive signal paths; and selecting an optical gain imbalance between the signal paths based on an effective bandwidth of the input signal for compensating for signal impairments in the input signal Various preferred embodiments of the present invention will now be described in detail with reference to the accompanying drawings.

DETAILED DESCRIPTION

The details of preferred embodiments and best mode for carrying out the ideas of the invention will now be presented. It should be understood that it is not necessary to employ all of the details of the preferred embodiments in order to carry out the idea of the invention. It should be further understood that the details of the preferred embodiments may be mixed and matched for carrying out the invention. Therefore, these details should be viewed for understanding the idea of the invention but should not to be read as limitations of the idea that is expressed in the below listed claims.

The preferred embodiments are described in terms of binary phase shift keyed (BPSK) signals using a differentially-encoded BPSK (DeBPSK, or DPSK) modulation format. However, the idea of the invention may be carried out with higher order modulation formats such as quadrature phase shift keyed (QPSK), 4QAM, 8PSK, 16QAM and so on. For example, the idea can be carried out with differentially-encoded QPSK (DQPSK) and so on.

Figure 1:
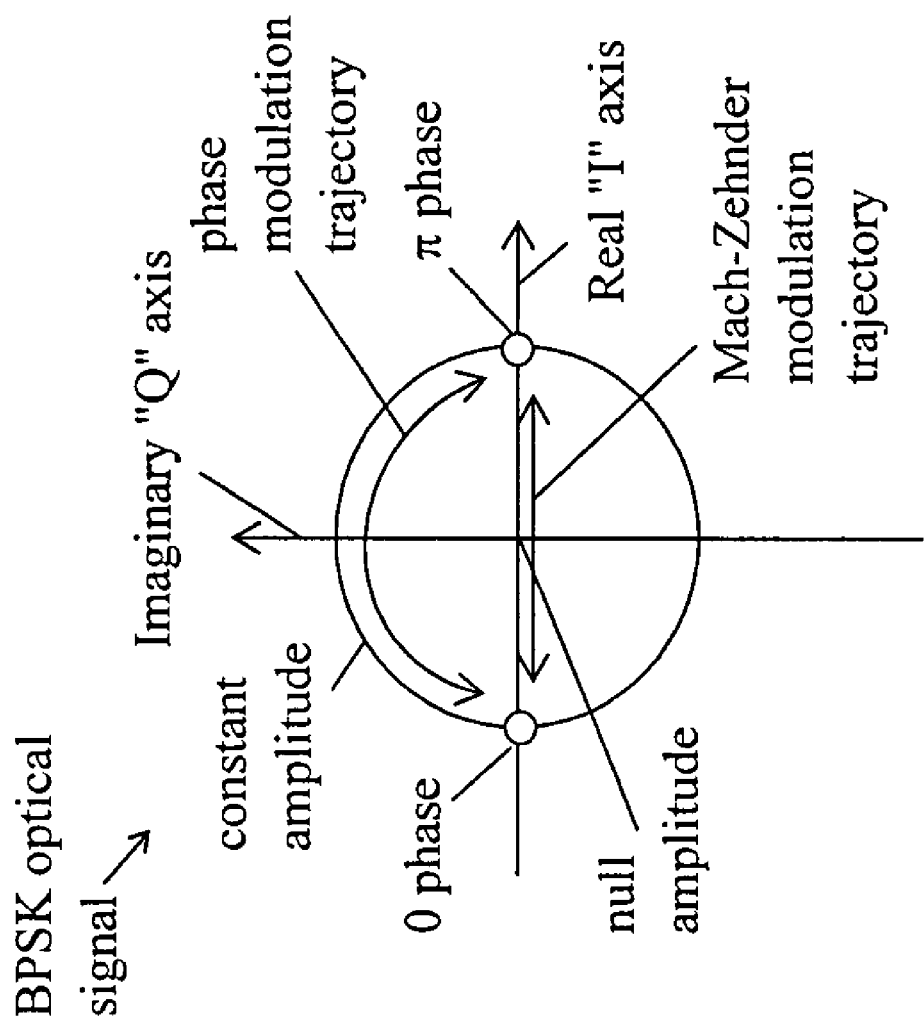
FIG. 1 is a vector diagram of a BPSK signal.

FIG. 1 is a vector representation of a binary phase shift keyed (BPSK) optical signal having phase states of 0 and $\pi$ radians. Real (in-phase or "I") and imaginary (quadrature phase or "Q") parts of the complex BPSK optical signal are shown on horizontal and vertical axes, respectively. The BPSK signal between phase states of 0 and $\pi$ may have a trajectory in the IQ plane of pure phase modulation (continuously changing phase with constant amplitude); or a trajectory in the IQ plane of Mach-Zehnder modulation (continuously changing amplitude through an amplitude null); or anything in between. For a DPSK modulation format, the logical bits are encoded as the differences between consecutive phase states.

Figure 2:
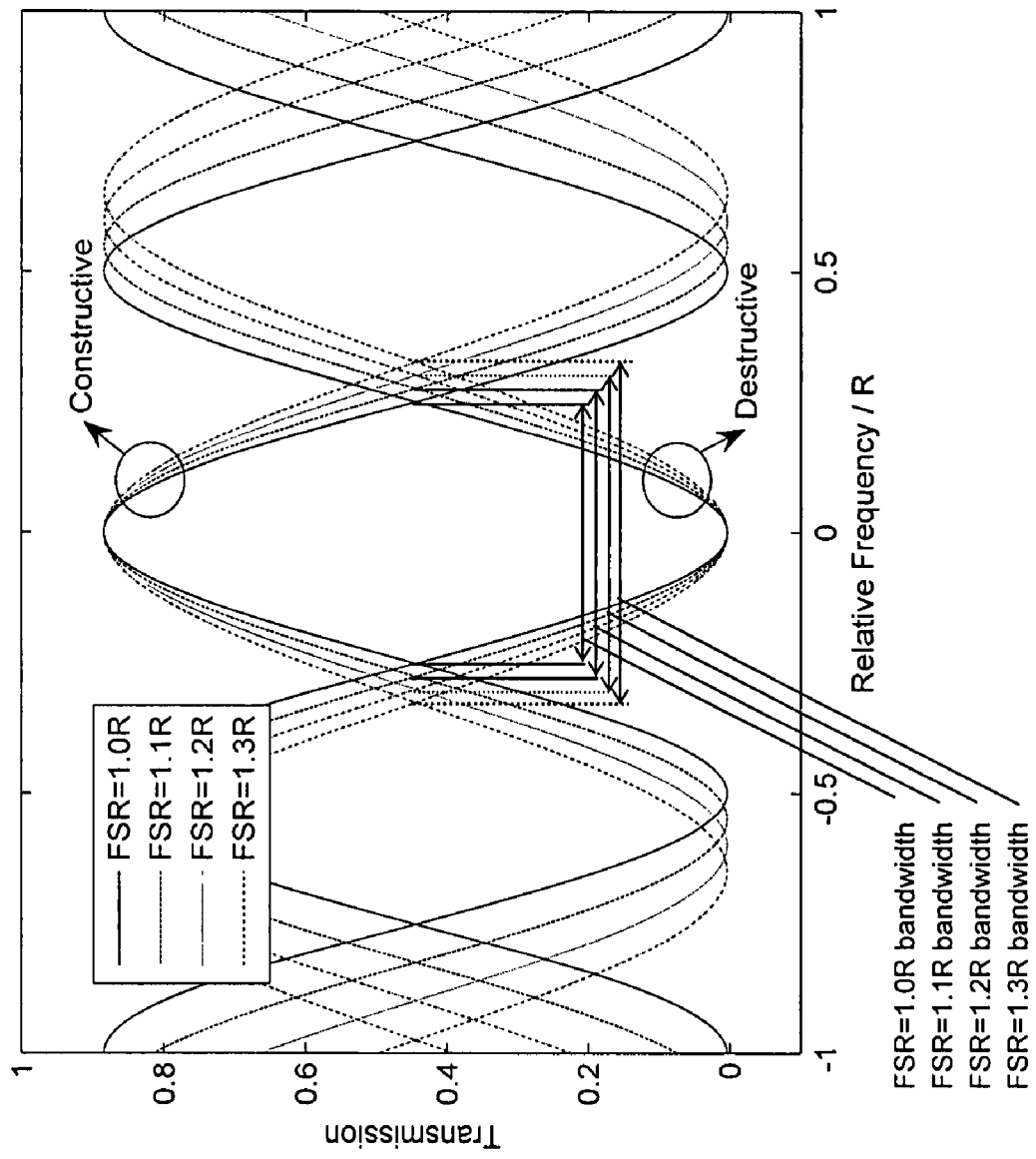
FIG. 2 is a chart of constructive and destructive transfer functions in a delay line interferometer (DLI) for an adjustable free spectral range (FSR)

FIG. 2 is a chart showing exemplary constructive and destructive transfer functions, referred to below as G($f$) and H($f$), between an input port and constructive and destructive output ports for a signal processor having a delay line interferometer (DLI). The transfer functions G($f$) and H($f$) are frequency responses of transmitted optical power versus frequency. The vertical axis of the chart shows power transmission. The horizontal axis of the chart shows frequency for an optical input signal scaled to modulation symbol rate R, relative to a center frequency of the transfer functions. The center frequency of the transfer functions is shown as zero. The scale factor R is the inverse of the symbol time T for modulation phase states carried by the optical signal.

The DLI has a transit time difference Y for demodulating a differentially modulated signal. The transit time difference Y (FIGS. 4 and 5) is also referred to in some places as the differential transit time Y or simply as the time Y. The inverse of the time Y defines a free spectral range (FSR) of the DLI. The constructive and destructive transfer functions G($f$) and H($f$) are shown for free spectral ranges (FSR)s of 1.0 R, 1.1 R, 1.2 R and 1.3 R. Increasing the FSR effectively increases the bandwidth of the constructive and destructive transfer functions. The bandwidth of the constructive transfer function in this case is the frequency spectrum between points at one-half the maximum amplitude. The bandwidth of the destructive transfer function is understood to be the bandwidth of the stop band of the constructive transfer function. Equations 1 and 2 show constructive and destructive transfer functions G($f$) and H($f$), respectively, for the DLI.

$$G(f)=[1+\cos(2\pi fY)]/2 \quad (1$$

$$H(f)=[1-\cos(2\pi fY)]/2 \quad (2$$

It can be seen that the FSR transfer functions G($f$) and H($f$) are periodic in the frequency domain. Phase of the periodic transfer function (offset in the frequency domain) is known as an FSR phase. In an optical system using differential modulation, best signal quality may be obtained when the FSR phase is adjusted so that the transfer functions G($f$) and H($f$) have a maximum ratio or normalized difference (difference scaled by the sum) at the carrier frequency of the optical signal or the center of the energy in the spectrum of the modulated optical signal. FIG. 2 shows the correct adjustment for the transfer function phase or FSR phase for maximum transfer function difference with the center frequency of the transfer functions aligned to the center frequency and carrier frequency of the received optical input signal for a symmetrical optical input signal spectrum.

Figure 3:
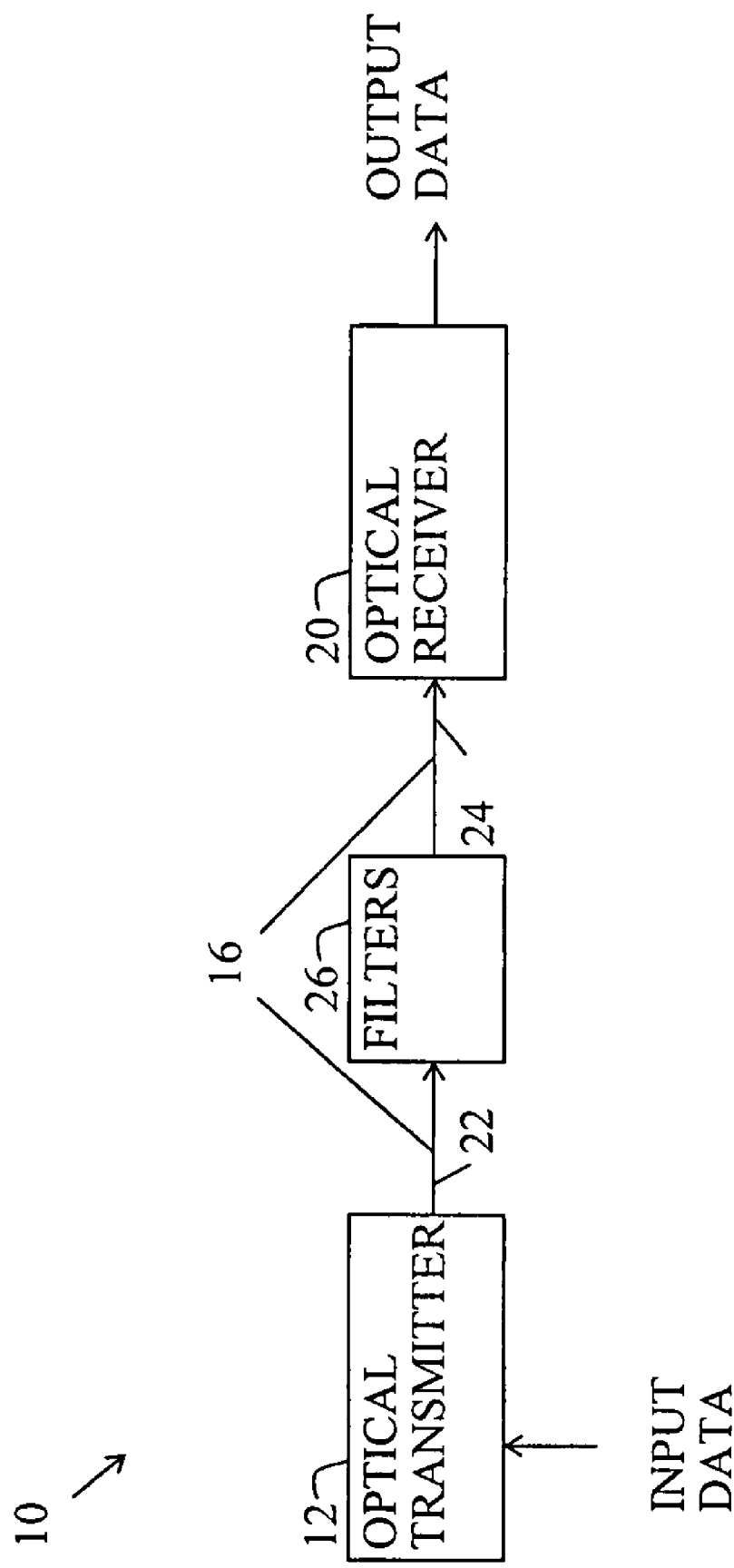
FIG. 3 is a block diagram of an optical transmission system of the present invention for receiving a modulated optical signal.

FIG. 3 is a block diagram of a data transmission system of the present invention referred to with a reference number 10. The system 10 includes an optical transmitter 12 and an optical receiver 20. The transmitter 12 and the receiver 20 are connected through an optical transmission link 16. The transmission link 16 may use wavelength division multiplexing (WDM) for carrying several optical signals simultaneously using different optical carrier frequencies.

The transmitter 12 transmits an optical signal using a differentially-encoded phase shift keyed (DPSK) modulation format where logical 1's and 0's of input data are encoded to phase differences between adjacent (consecutive in time) phase states. For example for DPSK, adjacent phase states of 0 radians and adjacent phase states of π radians both carry a data bit having a logical "0"; and a phase state of 0 radians following a phase state of π radians and a phase state of π radians following a phase state of 0 radians both carry a data bit having a logical "1". Of course, the logical "0" and logical "1" may be reversed without loss of generality. It should also be noted that any two phase states that are separated by π radians may be used for the DPSK modulation.

The transmitter 12 illuminates one end of the link 16 with a modulated optical signal 22 having differentially-encoded phase shift keyed (DPSK) modulation for the logical bits of input data. The signal 22 passes through the link 16 and emerges at the other end of the link 16 as a modulated optical signal 24 to be received by the receiver 20. The link 16 has a frequency response having an effective optical bandwidth caused by one or more filters represented by filters 26. The optical bandwidth of the link 16 results in an effective optical bandwidth of the spectrum of the input signal 24.

The receiver 20 demodulates the signal 24 for providing output data that is its best estimate of the input data. The output data is desired to be an exact replica of the input data. However, the transmission link 16 degrades or impairs the quality of the received signal 24 and this degradation or impairment in signal quality causes the receiver 20 to occasionally make errors in the output data that it provides. One of the primary causes of the signal degradation is intersymbol interference (ISI) in the link 16 induced by the filters 26. The receiver 20 of the present invention has apparatus and methods, described below, for compensating for the quality degradation in the link 16, especially the ISI, in order to reduce the errors in the output data.

The apparatus and methods of the receiver 20 use measurements of signal quality and calculations based on the effective optical bandwidth of the link 16 and/or the effective optical bandwidth of the input signal 24 for compensating for one or more signal degradations or impairments in the input signal that may include but are not limited to ISI, signal-dependent noise and signal independent noise. The signal quality measurements may be bit error ratio (BER) measurements or eye opening ratio measurements. In some cases the signal quality measurements may use signal to noise measurements taken from optical or electrical constructive and destructive path signals in the receiver 20. In a preferred embodiment, the receiver 20 uses calculations based on the effective optical bandwidth of the link 16 for minimizing the BER for the received input signal 24.

Figure 4:
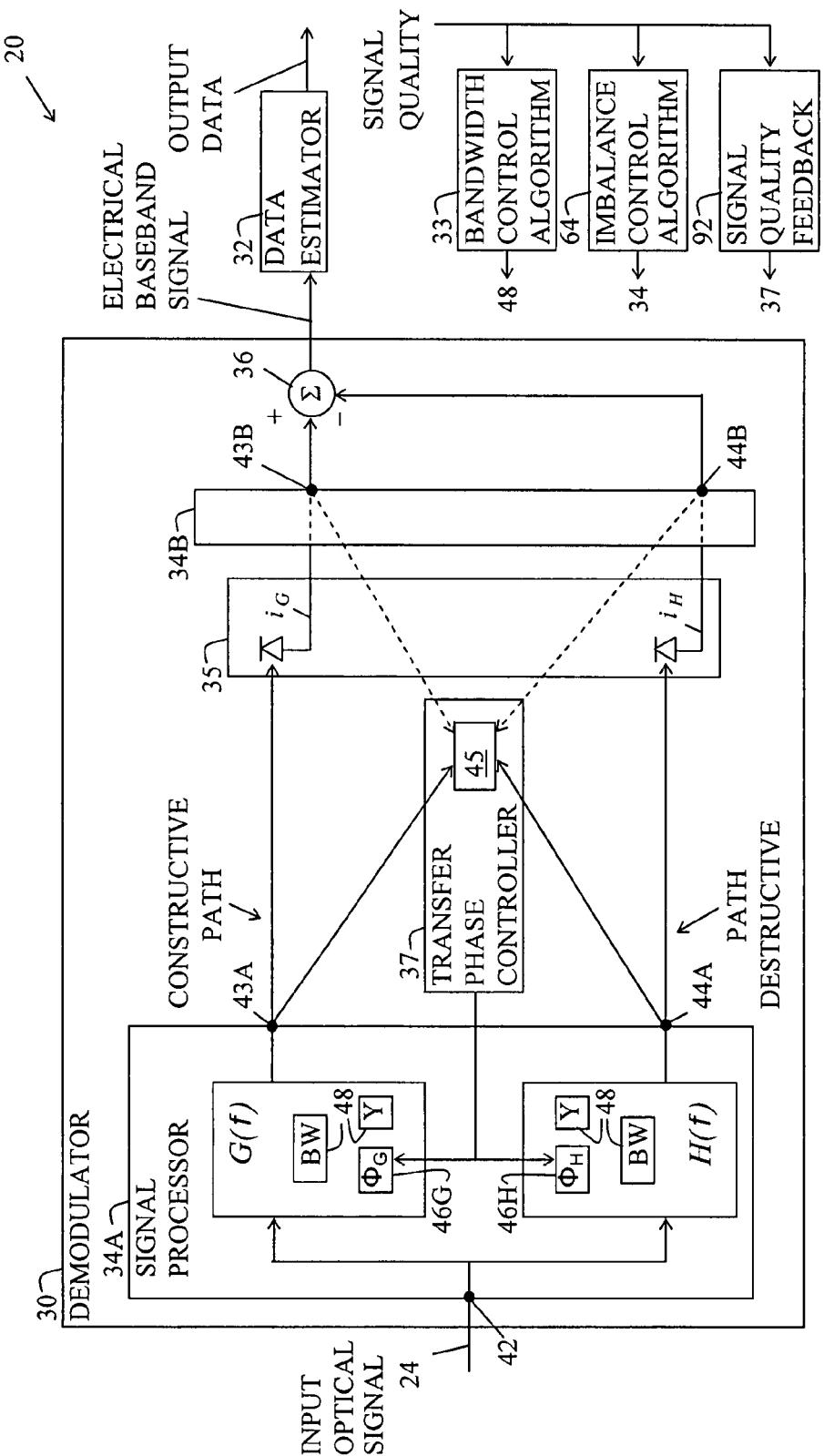
FIG. 4 is a general block diagram of an optical receiver for the system of FIG. 3.

FIG. 4 is a block diagram of an optical receiver of the present invention referred to with the reference number 20. The receiver 20 receives the optical signal 24 and provides output data that is its best estimate of the input data that was transmitted by the transmitter 12.

The receiver 20 includes a demodulator 30 and a data estimator 32. The receiver 20 or an external computer includes a bandwidth control algorithm 33. The demodulator 30 demodulates the optical input signal 24 and issues an electrical baseband signal. The data estimator 32 processes the baseband signal and issues the output data. The receiver 20 may also include an input optical filter for filtering the optical signal 24 into a channel when the optical signal 24 is wavelength division multiplexed (WDM) and contains multiple channels.

The demodulator 30 includes a signal processor 34, a detector apparatus 35, a combiner 36, and a transfer phase controller 37. The signal processor 34 has two parts, an optical signal processor 34A and an electrical signal processor 34B. The optical signal processor 34A receives the signal 24 at an input port 42; separates the signal 24 into optical constructive and destructive interference signals; differentially demodulates the signal 24 with a differential transit time Y; and issues the signals at constructive and destructive output ports 43A and 44A, respectively. The detector apparatus 35 receives the optical constructive and destructive paths signals from the ports 43A and 44A and converts photons to electrons for providing electrical constructive and destructive path signals shown as electrical currents $i_G$ and $i_H$ for the modulations on the optical signals.

The signal processor 34B processes the electrical signals and passes the processed electrical signals through constructive and destructive output ports 43B and 44B, respectively, to the combiner 36. The combiner 36 takes a difference between the instantaneous signal level of the constructive path signal and the instantaneous signal level of the destructive path signal for providing the baseband signal. In a variation of the receiver 20, the data estimator 32 connects to the ports 43B and 44B for receiving differential electrical signals.

The separation of the input signal 24 using optical interference into the constructive and destructive paths provides the constructive and destructive transfer functions G($f$) and H($f$), respectively, in the signal processor 34A. The transfer functions G($f$) and H($f$) are a part of the constructive and destructive transfer functions provided by the signal processor 34 and the detector apparatus 35 from the input port 42 to the constructive and destructive output ports 43B and 44B, respectively. However in one preferred embodiment the constructive and destructive transfer functions are primarily determined within the signal processor 34A to the output ports 43A and 44A.

The transfer phase controller 37 includes a detector 45 for measuring and averaging power-related levels for the signals at the output ports 43A and 44A (or 43B and 44B). The power-related levels that are measured are indicative of, or have a monotonic relationship to, the signal powers at the output ports 43A and 44A (or the output ports 43B and 44B). For example, the measurements may be signal power, average signal magnitude, squared signal level, or absolute value of signal level with an arbitrary exponent. The transfer phase controller 37 uses the measurements for providing a feedback signal that maximizes the ratio of the signal power for the port 43A to the signal power for the port 44A (or the signal power for the port 43B to the signal power for the port 44B). The idea may also be used in an inverted mode for maximizing the ratio of the signal power for the port 44A to the signal power for the port 43A (or the signal power for the port 44B to the signal power for the port 43B).

The signal processor 34A has controllable transfer phase elements 46G and 46H for providing adjustable phase shifts $\Phi_G$ and $\Phi_H$ for the constructive and destructive transfer functions. The elements 46G and 46H may be the same physical element 46 and the phase shifts $\Phi_G$ and $\Phi_H$ may be the same phase shift $\Phi$. The transfer phase controller 37 uses the power-related measurements from the detection 45 for controlling the elements 46G and 46H, or the element 46, for adjusting the phases $\Phi_G$ and $\Phi_H$, or the phase $\Phi$, for shifting the phases of the transfer functions for a maximum normalized signal power difference between the signals at the constructive port 43A (or 43B) and the destructive port 44A (or 44B). This process may be used to tune the transfer functions G(f) and H(f) relative to the carrier frequency of the modulated optical signal 24 and at the center frequency of the energy in the modulated optical signal 24.

The signal processor 34A has a transfer bandwidth element 48 for providing a selectable or controllable bandwidth (BW) where at least one of the constructive and destructive transfer functions depends, at least in part, upon this bandwidth. In a preferred embodiment the optical signal processor 34A includes a delay line interferometer (DLI). In this case the bandwidth is defined or modified by the inverse of the time Y.

Figure 10:
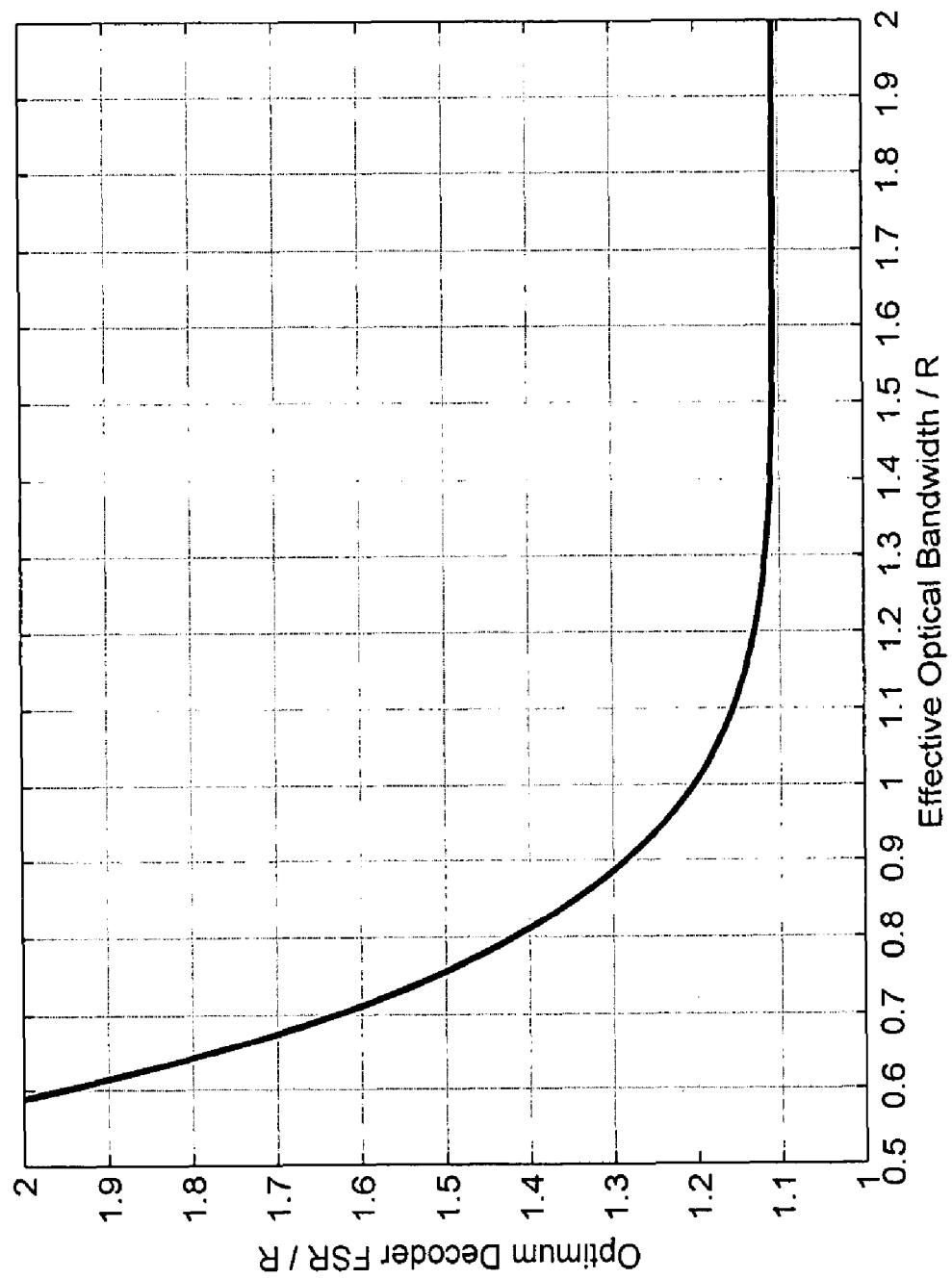
FIG. 10 is a chart showing a calculation of FSR based on system bandwidth in order to compensate for the ISI in the system of FIG. 3.

During the design or installation of the receiver 20, or when the receiver 20 is in operation, a calculation or test is made, or active feedback is provided, for signal quality or a bit error ratio of the output data. A primary degradation of the signal quality in the system 10 is intersymbol interference (ISI) caused by the filters 26. The bandwidth control algorithm 33 calculates or provides feedback for determining or controlling the transfer bandwidth element 48 as shown in the chart of FIG. 10. The calculation or test, or active feedback, is used for selecting or controlling the element 48 in order to select or adjust the bandwidth for providing the best signal quality or minimum ISI for the system 10. The signal quality may be measured on the optical or electrical signals, by measuring eye opening in a baseband signal or by measuring bit error ratio (BER).

An imbalance control algorithm 64 may be included for calculating a gain imbalance or providing feedback from signal quality data to the signal processor 34 to either the optical processor 34A or the electrical processor 34B or both for optimizing signal quality. The signal processor 34 uses the gain imbalance calculations or feedback to imbalance the gains between the constructive and destructive path signals. The gain imbalance calculations may be based on the effective optical bandwidth of the link 16 and the input signal 24.

A side effect of changing the selection of the transit time difference Y is that the transfer function phase or FSR phase of the transfer functions G(f) and H(f) may slide many cycles with respect to the frequency of the input signal 24. In a general rule, whenever the FSR delay is changed, the transfer function phase shift $\Phi$, or phase shifts $\Phi_G$ and $\Phi_H$, must be re-adjusted by the transfer (FSR) phase controller 37 by adjusting the transfer (FSR) phase element 46, or 46G and 46H, for re-centering the transfer functions G(f) and H(f) to its optimal frequency position. When the received optical spectrum is symmetrical, the optimal position coincides with the carrier frequency of the input optical signal 24. On the other hand the effect of changing the phase shift $\Phi$, or phase shifts $\Phi_G$ and $\Phi_H$, on the FSR bandwidth is so small that is insignificant.

The receiver 20 may also include a path for signal quality feedback 92. Data for signal quality is processed through the signal quality feedback 92 and passed to the transfer phase controller 37. The transfer phase controller 37 uses the processed signal quality data for fine tuning the phase delay of the transfer phase element 46 for improving and optimizing the signal quality. Preferably, the element 46 is first tuned in a feedback loop according to the power-related measurements and then fine tuned in a second feedback loop for minimizing a bit error ratio (BER). The signal quality data may be obtained by measuring BER directly, by measuring an eye opening ratio of a baseband signal, and/or by measuring a signal to noise ratio (SNR) of the optical or electrical constructive and destructive path signals.

Figure 5:
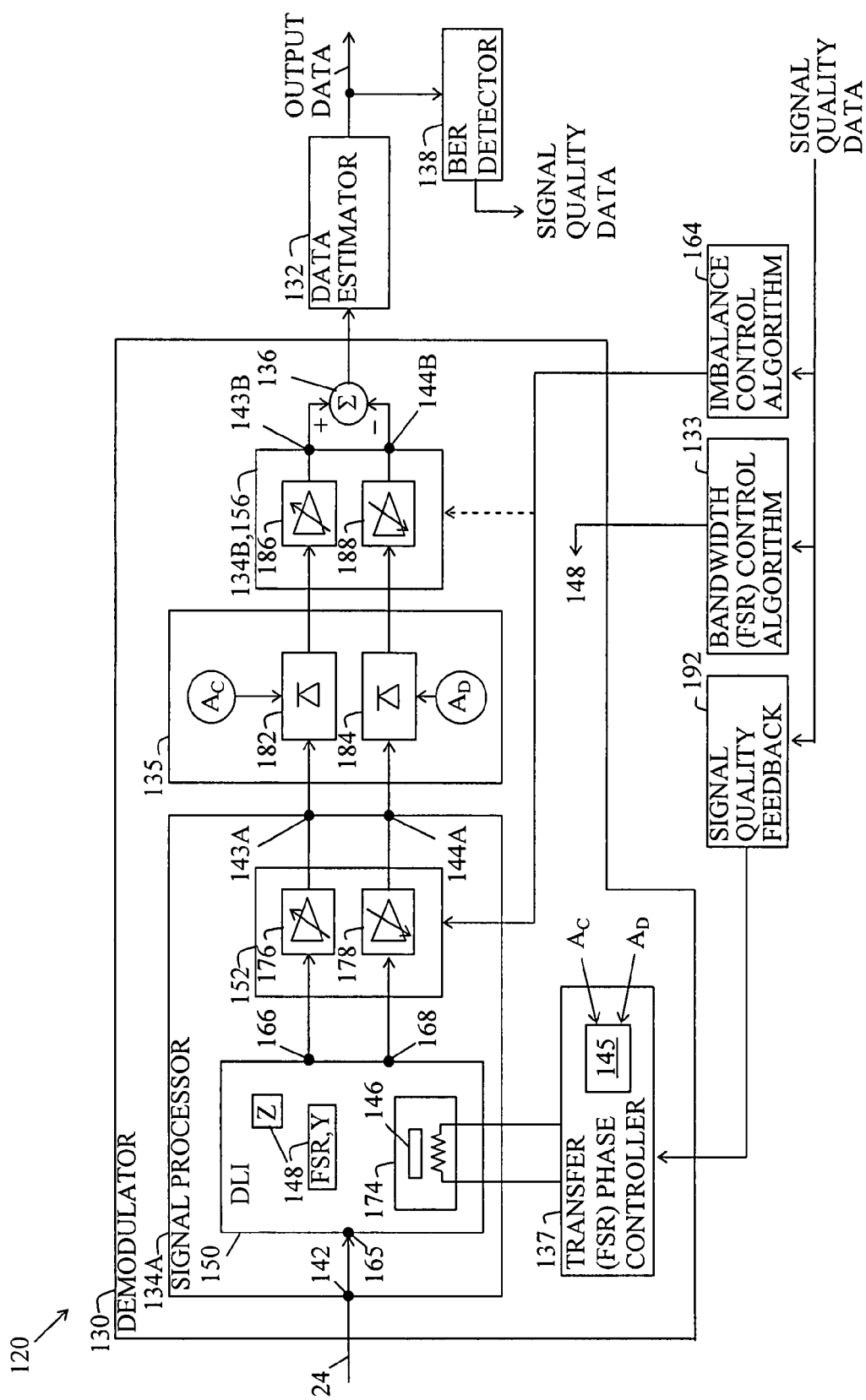
FIG. 5 is a detailed block diagram of an optical receiver including a delay line interferometer (DLI) for the system of FIG. 3.

FIG. 5 is a detailed block diagram of an optical receiver of the present invention referred to with a reference number 120. The receiver 120 is an embodiment of the receiver 20 described above for the system 10. Elements of the receiver 120 that are analogous to, or embodiments of, elements of the receiver 20 are denoted by incrementing the reference identification numbers by 100.

The receiver 120 includes a demodulator 130, a data estimator 132 and a bit error ratio (BER) detector 138. The receiver 120, or an external computer, also includes a bandwidth (FSR) control algorithm 133, and an imbalance control algorithm 164. The demodulator 130 demodulates the optical signal 24 and passes the demodulated electrical signal to the data estimator 132. The data estimator 132 processes the electrical signal for making a best estimate of the original input data and issues its best estimated input data as output data. The BER detector 138 estimates a BER for the output data. The BER may be used as signal quality data. The demodulator 130 uses the signal quality data through the algorithms 133, 164 and 192.

The demodulator 130 includes a signal processor 134, a detector apparatus 135, a combiner 136 and a transfer free spectral range (FSR) phase controller 137. The signal processor 134 includes an optical signal processor 134A and an electrical signal processor 134B. The optical signal processor 134A receives the optical input signal 24 at an input signal port 142; separates the signal 24 into optical constructive and destructive interference signals; differentially demodulates the signal 24 with the differential time Y; and issues signals from constructive and destructive output ports 143A and 144A, respectively, to the detector apparatus 135.

The detector apparatus 135 converts the modulations on the optical constructive and destructive path signals to electrical signals and passes the electrical signals to the electrical signal processor 134B. The electrical signal processor 134B processes the electrical signals and issues the processed electrical signals at constructive and destructive output ports 143B and 144B, respectively, to the combiner 136. The combiner 136 takes a difference between the instantaneous signal level of the constructive path signal and the instantaneous signal level of the destructive path signal for providing the baseband signal. In a variation of the receiver 120, the data estimator 132 connects to the ports 143B and 144B for receiving differential electrical signals.

The optical signal processor 134A includes a delay line interferometer (DLI) 150 and an optical imbalancer 152. The electrical signal processor 134B includes an electrical imbalancer 156. The DLI 150 has an input port 165 connected to the input port 142 of the demodulator 130 for receiving the signal 24. The constructive transfer function of the DLI 150 between the input port 165 and its constructive output port 166 includes the transfer function G(f) of the equation 1. The destructive transfer function of the DLI 150 between the input port 165 and its destructive output port 168 includes the transfer function H(f) of the equation 2.

The constructive transfer function of the signal processor 134 between the input port 142 and the constructive output port 143B includes the constructive transfer function of the DLI 150 and the transfer functions in the constructive signal path of the optical imbalancer 152, the detector apparatus 135 and the electrical imbalancer 156. Similarly, the destructive transfer function of the signal processor 134 between the input port 142 and the destructive output port 144B includes the destructive transfer function of the DLI 150 and the transfer functions in the destructive signal path of the optical imbalancer 152, the detector apparatus 135 and the electrical imbalancer 156.

The signals at the constructive and destructive output ports 166 and 168 may be created with optical interference by separating the input signal at the port 165 into two paths and then recombining the signals. The DLI 150 has a first signal delay element referred to as a transfer free spectral range (FSR) bandwidth element 148 and a second signal delay element referred to as a transfer (FSR) phase element 146. The FSR phase element 146 provides a delay difference between the signal transit times in the signal paths in the DLI 150 and also provides a transfer function phase shift Φ to the constructive and destructive free spectral range transfer functions for the DLI 150. The FSR bandwidth element 148 provides a signal delay Z (FIGS. 6A-C) between the signal transit times in the signal paths in the DLI 150.

The signal delay Z provided by the FSR bandwidth element 148 is called an FSR delay to distinguish it from the signal delay difference provided by the FSR phase element 146 called an FSR phase delay. The reader should be aware that two different types of phases are being described here—the phases of the periodic signals and the phases of the periodic transfer functions G(f) and H(f). The FSR delay Z is a major contributor to the signal transit time difference Y for differentially demodulating the input signal 24. It should be noted that for the receiver 120, the time difference Y will not, in general, be the same as the symbol time T of the modulated signal 24. In a typical system 10, the time difference Y of the receiver 120 is less than about 83% of the symbol time T.

The inverse of the time difference Y defines the free spectral range (FSR) and the bandwidth of the constructive and destructive transfer functions of the DLI 150. The free spectral range of the DLI 150 determines or is a contributor to the constructive and destructive transfer functions G(f) and H(f) for the DLI 150. The FSR delay Z of the FSR bandwidth element 148 is selected or adjusted based on known or measured characteristics of the link 16 to provide the time difference Y that provides a desired free spectral range (FSR) for the DLI 150 for improving the performance of the system 10, and especially for reducing the signal quality degradation due to intersymbol interference (ISI) caused by the filters 26. The bandwidth (FSR) control algorithm 133 calculates or provides feedback for determining or controlling the element 148 as shown in the chart of FIG. 10. In some embodiments the FSR bandwidth element 148 and the FSR phase element 146 may be combined as a single element having a large delay Z having a small adjustable range for providing the phase shift Φ.

The FSR phase element 146 is used for fine tuning the phase Φ of the cyclic frequency response of the transfer functions G(f) and H(f) to tune the transfer functions G(f) and H(f) relative to the carrier frequency of the modulated input signal 24. In general, the FSR phase must be re-adjusted each time a new FSR delay Z is selected or adjusted. The FSR phase element 146 may be controlled by a mechanism 174 included in the DLI 150 where the mechanism 174 is controlled by the FSR phase controller 137. The mechanism 174 may be an oven for controlling the temperature of the element 146.

The receiver 120 may include an input optical filter for filtering the optical signal 24 into a channel when the optical signal 24 has multiple channels that are wavelength division multiplexed (WDM). The input optical filter may be viewed as one of the filters 26 in the link 16. It is desirable for cost and convenience that the same processor 134, and the same DLI 150 be used for any channel.

In an exception to the general rule stated above, the FSR phase controller 137 and FSR phase element 146 may not be necessary when the FSR bandwidth element 148 is selected for providing the time difference Y exactly equal to the inverse of the frequency spacing of the channels. For example, for a channel spacing of 50 GHz and a symbol time of 23 picoseconds, the time difference Y might be 20 picoseconds. However, in this special case, the FSR of the DLI 150 may not be optimized for best BER. In the receiver 120, the FSR bandwidth element 148 is selected according to a criteria of compensating for ISI in the transmission link 16 for providing the transit time difference Y and the FSR for best BER where the time difference Y is not the inverse of the channel spacing.

The optical imbalancer 152 includes constructive and destructive variable gain elements 176 and 178 for controlling the optical gains that are applied to the signals from the output ports 166 and 168, respectively, in order to provide a gain imbalance between the constructive and destructive signals to the output ports 143A and 144A. The gains of the elements 176 and 178 may be controlled by the imbalance control algorithm 164 for varying the ratio of the power gains for constructive and destructive paths for providing constructive and destructive transfer functions $g_o(f)$ and $h_o(f)$ according to respective equations 3 and 4. In the equations 3 and 4, the optical gain imbalance, shown with symbol $\beta_o$, varies from minus one to plus one.

$$g_o(f)=1-\beta_o \qquad (3$$

$$h_o(f)=1+\beta_o \qquad (4$$

The imbalance operation may be provided dynamically in a closed loop using active feedback for minimizing the BER from the BER detector 138. Or, the imbalance operation may be "set and forget" (until it is set and forgotten again) after measuring the BER. Or, the imbalance operation may be open loop based on calculations from known or measured characteristics of the link 16. The calculations are shown in a FIG. 11 that is described below. The gain elements 176 and 178 may use variable amplification or variable attenuation for providing the gain ratio. Only one of the gain elements 176 and 178 is required to be variable in order to provide the variable gain ratio.

The detector apparatus 135 includes a constructive photo-detector 182 and a destructive photo-detector 184 for detecting the optical signals for the ports 143A and 144A, respectively, by converting photons to electrons for providing electrical signals to the electrical imbalancer 156. Photodiodes may be used for the detectors 182 and 184. Each photodiode 182 and 184 produces an electrical signal proportional to detected optical power. The constructive and destructive transfer functions from the input port 165 to the electrical outputs of the detector apparatus 135 include the terms of respective equations 5 and 6.

$$G(f)*g_o(f)=\{[1+\cos(2\pi fY)]/2\}*(1-\beta_o) \tag{5}$$

$$H(f)*h_o(f)=\{[1-\cos(2\pi fY)]/2)\}*(1+\beta_o) \tag{6}$$

The FSR phase controller 137 controls the phase delay of the FSR phase element 146 for maximizing a ratio of the optical powers in the constructive and destructive detectors 182 and 184. In a preferred embodiment, FSR phase controller 137 includes a detector 145 for making a power-related measurement for the signals in the constructive and destructive signal paths. The detector 145 measures and then averages the optical powers in the constructive and destructive detectors 182 and 184 by measuring photocurrents $A_C$ and $A_D$, respectively. The photocurrents are the electrical currents in the detectors 182 and 184 that result from the conversions of photons to electrons. The photocurrents are measured by measuring the electrical currents passing through the detectors 182 and 184 and then averaging to remove high frequency components. The high frequency components can be removed with low pass electrical filters with passbands lower than the bandwidth of the optical modulation.

An algorithm in the FSR phase controller 137 controls the phase delay of the FSR phase element 146 in order to maximize a ratio, difference or normalized difference of the transfer functions. The normalized difference is the difference between the constructive and destructive signal path power-related measurements divided by the sum of the constructive and destructive signal path power-related measurement. The FSR phase controller 137 may be constructed in order to maximize the normalized difference ΔB measured from the average photocurrents as shown in an equation 7.

$$\Delta B=(A_C-A_D)/(A_C+A_D) \tag{7}$$

The receiver 120 may also include a path for signal quality feedback 192. Data for signal quality is processed through the signal quality feedback 192 and passed to the FSR phase controller 137. The FSR phase controller 137 uses the processed signal quality data for fining tuning the phase delay of the FSR phase element 146 in order to improve and optimize the signal quality. Preferably, the FSR phase element 146 is first tuned in a feedback loop for maximizing a constructive-destructive normalized power difference and then fine tuned for minimizing a bit error ratio (BER). The signal quality data may be obtained by measuring BER directly, by measuring an eye opening ratio of a baseband signal and/or by measuring a signal to noise ratio (SNR) of the optical or electrical constructive and destructive path signals.

The electrical imbalancer 156 includes constructive and destructive variable gain elements 186 and 188 for controlling the electrical gains applied to the signals from the constructive and destructive detectors 182 and 184, respectively, and issuing signals from output ports 143B and 144B. The gains of the elements 186 and 188 may be controlled by the imbalance control algorithm 164 for varying the ratio of the gains for constructive and destructive paths for providing constructive and destructive transfer functions $g_e(f)$ and $h_e(f)$ according to respective equations 8 and 9. In the equations 8 and 9, the electrical gain imbalance, shown with symbol $\beta_e$, varies from minus one to plus one.

$$g_e(f)=1-\beta_e \tag{8}$$

$$h_e(f)=1+\beta_e \tag{9}$$

The imbalance operation may be provided dynamically in a closed loop using active feedback for minimizing the BER from the BER detector 138. Or, the imbalance operation may be "set and forget" (until it is set and forgotten again) after measuring the BER. Or, the imbalance operation may be open loop provided based on calculations from known or measured characteristics of the link 16. The calculations are shown in a FIG. 11 that is described below. The gain elements 186 and 188 may use variable amplification or variable attenuation for providing the gain ratio. Only one of the gain elements 186 and 188 is required to be variable in order to provide the variable gain ratio.

The combiner 136 takes the difference between the electrical signals from the constructive and destructive output ports 143B and 144B and passes the difference as a baseband signal to the data estimator 132. The baseband signal is the demodulated signal corresponding to the input signal 24.

The baseband signal has instantaneous signal levels that in a system with no degradation would be exactly representative of the input data at sample times synchronized to a data clock. For example at the sample times, one signal level would represent a logical "1" and another signal level would represent a logical "0" for the input data. However, various signal degradations, especially intersymbol interference (ISI) due to the filters 26 in the link 16, cause the signal levels of the baseband signal at the sample times to have many levels and occasionally even have levels where a "1" appears to be a "0" and vice versa. The baseband signal synchronized to the data clock and shown over and over again on the same display appears as an eye diagram where the opening of the eye is a measure of the quality of the demodulated signal.

The data estimator 132 recovers frame and data clock signals and uses error detection and correction techniques for making it best estimate of the input data. Its best estimate of the input data is issued as output data. The BER detector 138 uses error detection and correction information from the date estimator 132 and/or programmed knowledge of expected data bits in the output data for estimating a bit error ratio (BER). For dynamic operation, the BER detector 138 passes the BER to the imbalance control algorithm 164 in the demodulator 130. The function of the BER detector 138 for providing BER measurements or feedback may be replaced or augmented with a device for measuring the signal quality of the baseband signal. The signal quality device and/or measurement may be internal to the receiver 120 or external. Test equipment may be used as an external device for measuring signal quality or BER.

A side effect of changing the selection of the FSR delay Z is that the transfer function phase or FSR phase of the transfer functions G(f) and H(f) may slide many cycles with respect to the frequency of the input signal 24. In a general rule, whenever the FSR delay is changed, the transfer function phase shift Φ, or phase shifts $\Phi_G$ and $\Phi_H$, must be re-adjusted by the transfer (FSR) phase controller 137 by adjusting the FSR phase element 146 for re-tuning the transfer functions G(f) and H(f) to the frequency of the input optical signal 24.

On the other hand the effect of changing the phase shift Φ, or phase shifts $Φ_G$ and $Φ_H$, on the FSR bandwidth is so small that is insignificant.

The receiver 20, 120 includes a microprocessor system for operating the receiver 20, 120 according to instructions stored in a memory. These instructions include the above described bandwidth (FSR) control algorithm 33, 133, the imbalance control algorithm 64, 164 and the signal quality feedback 92, 192. Signal quality for the receiver 20, 120 may be defined in terms of BER, ISI, eye opening ratio, and/or signal to noise ratio (SNR). Typically the minimum BER, the best compensation for ISI, the largest eye openings and the highest signal to noise ratios (SNR)s of the optical and electrical constructive and destructive path signals are optimized, or nearly optimized, for the same selections and adjustments within the receiver 20, 120. The algorithm 192 may operate in a feedback loop for minimizing BER.

Figure 6A:
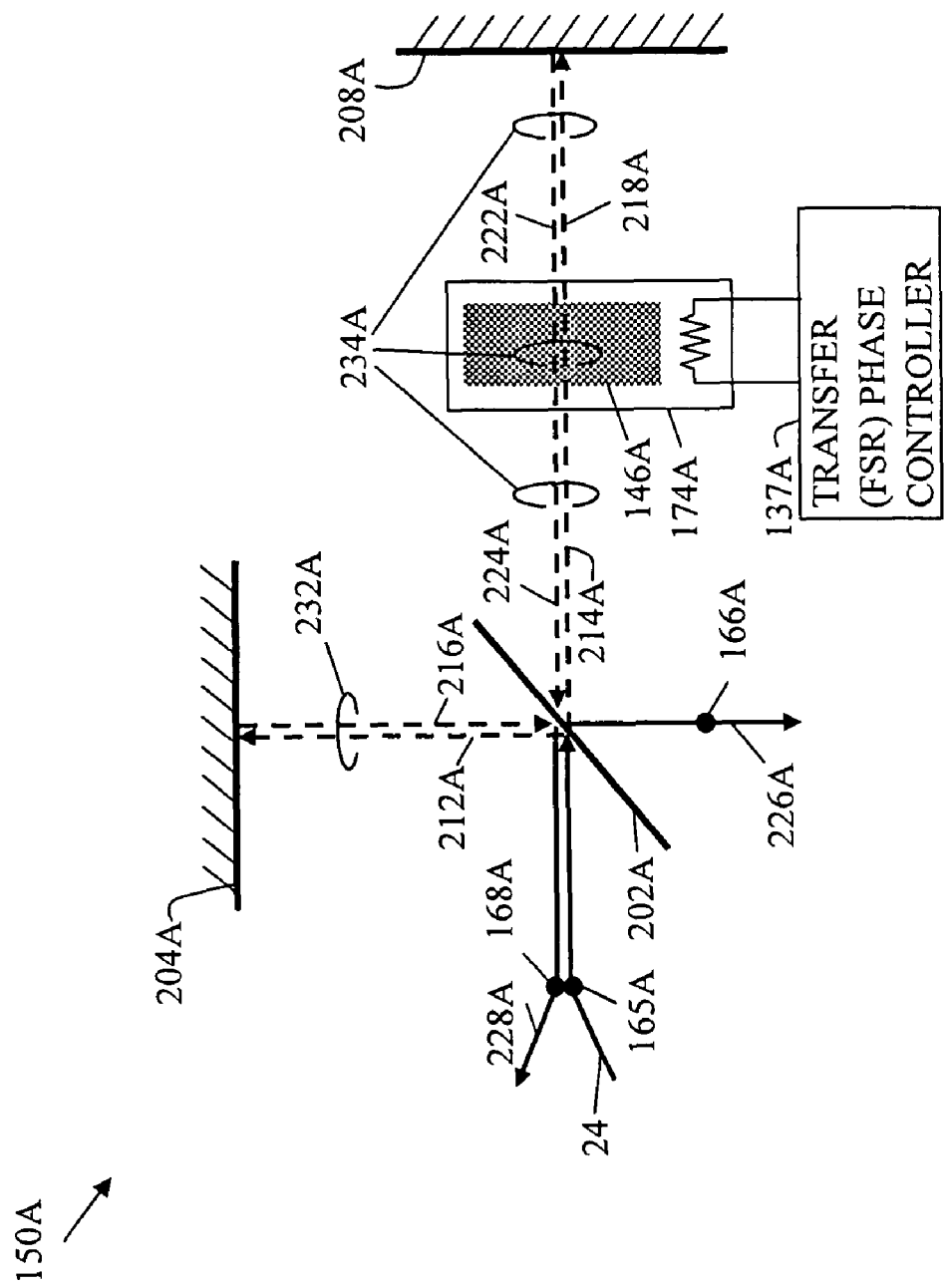
FIGS. 6A, 6B and 6C illustrate delay line interferometers (DLIs) for the receivers of FIG. 5.

FIG. 6A illustrates a delay line interferometer (DLI) 150A as an embodiment of the DLI 150. Elements associated with the DLI 150A that are analogous to elements associated with the DLI 150 are denoted by appending the reference identification numbers with the letter "A". The DLI 150A includes structural elements for an input port 165A, a transfer (FSR) phase element 146A, a mechanism or oven 174A, a partially reflecting first mirror 202A, a second mirror 204A, a third mirror 208A, and constructive and destructive output ports 166A and 168A.

The structural elements of DLI 150A are disposed as follows. The input optical signal 24 illuminates the front side of the partially reflecting first mirror 202A. The first mirror 202A is set at an angle to the path of the optical signal 24 so that part of the signal 24 is reflected as a signal 212A and part of the signal 24 is passed through as a signal 214A. The signal 212A is reflected from the second mirror 204A as a signal 216A back to the front side of the first mirror 202A. The signal 214A illuminates the element 146A and emerges after a fine tune phase delay as a signal 218A. The signal 218A reflects from the third mirror 208A as a signal 222A.

The signal 222A illuminates the element 146A and emerges after the phase delay as a signal 224A. The signal 224A illuminates the back side of the first mirror 202A. Part of the signal 224A is reflected from the back side of the first mirror 202A to combine with part of the signal 216A passed through the front side of the first mirror 202A for providing a signal 226A at the constructive output port 166A. Part of the signal 224A passes through the back side of the first mirror 202A to combine with part of the signal 216A reflected from the front side of the first mirror 202A for providing a signal 228A at the destructive output port 168A.

The elements of the DLI 150A split the input signal 24 into a first path 232A and a second path 234A. The transit time of the first path 232A is the sum of the transit times of the signals 212A and 216A. The transit time of the second path 234A is the sum of the transit times of the signals 214A, 218A, 222A and 224A plus two times the phase delay of the element 146A. The difference between the first and second path transit times is the differential transit time Y that is used for demodulation of the input optical signal 24. The time Y is fine tuned by adjusting the signal phase delay in the element 146A in order to adjust the FSR phase of the DLI 150A for adjusting the transfer function phase of the constructing and destructive transfer functions $G(f)$ and $H(f)$ (see FIG. 2).

The material for the element 146A is selected to have an optical index that depends upon temperature. The FSR phase controller 137A provides a control signal to adjust the temperature of the oven 174A in order to fine tune the delay of the element 146A for centering the constructive and destructive transfer functions $G(f)$ and $H(f)$ of the DLI 150A on the optical carrier frequency of the input optical signal 24.

Figure 6B:
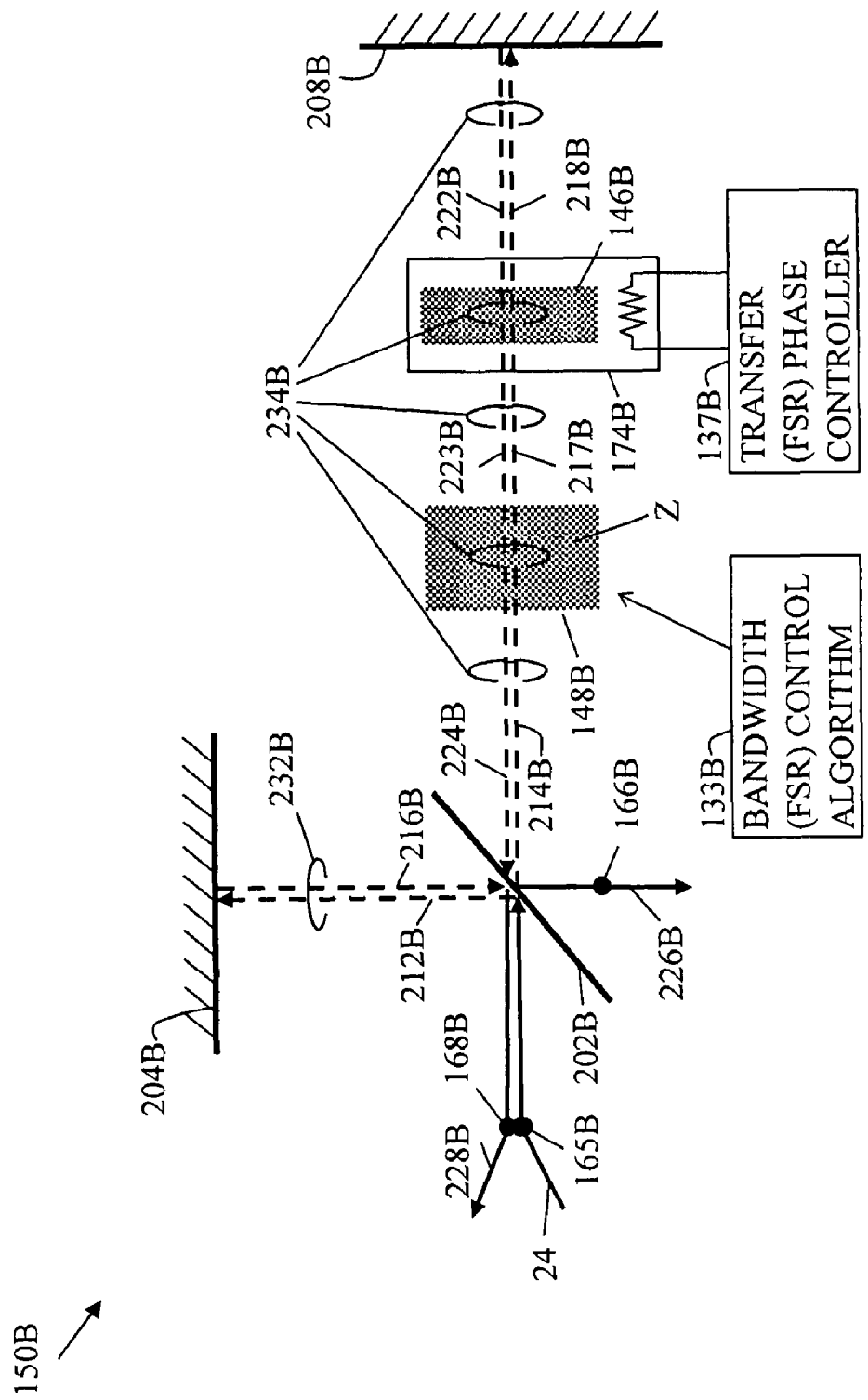

FIG. 6B illustrates a delay line interferometer (DLI) 150B as an embodiment of the DLI 150. Elements associated with the DLI 150B that are analogous to elements associated with the DLI 150 are denoted by appending the reference identification numbers by the letter "B". The DLI 150B includes structural elements for an input port 165B, a transfer FSR bandwidth element 148B, a transfer (FSR) phase element 146B, a mechanism or oven 174B, a partially reflecting first mirror 202B, a second mirror 204B, a third mirror 208B, and constructive and destructive output ports 166B and 168B.

The structural elements of DLI 150B are disposed as follows. The input optical signal 24 illuminates the front side of the partially reflecting first mirror 202B. The first mirror 202B is set at an angle to the path of the optical signal 24 so that part of the signal 24 is reflected as a signal 212B and part of the signal 24 is passed through as a signal 214B. The signal 212B is reflected from the second mirror 204B as a signal 216B back to the front side of the first mirror 202B. The signal 214B illuminates the element 148B and emerges after the delay Z as a signal 217B. The signal 217B illuminates the element 146B and emerges after a fine tune phase delay as a signal 218B. The signal 218B reflects from the third mirror 208B as a signal 222B.

The signal 222B illuminates the element 146B and emerges after the phase delay as a signal 223B. The signal 223B illuminates the element 148B and emerges after the delay Z as a signal 224B. The signal 224B illuminates the back side of the first mirror 202B. Part of the signal 224B is reflected from the back side of the first mirror 202B to combine with part of the signal 216B passed through the front side of the first mirror 202B for providing a signal 226B at the constructive output port 166B. Part of the signal 224B passes through the back side of the first mirror 202B to combine with part of the signal 216B reflected from the front side of the first mirror 202B for providing a signal 228B at the destructive output port 168B.

The elements of the DLI 150B split the input signal 24 into a first path 232B and a second path 234B. The transit time of the first path 232B is the sum of the transit times of the signals 212B and 216B. The transit time of the second path 234B is the sum of the transit times of the signals 214B, 217B, 218B, 222B, 223B and 224B plus two times the phase delay of the element 146B plus two times the delay Z. The difference between the first and second path transit times is the differential transit time Y that is used for demodulation of the input optical signal 24. A bandwidth (FSR) control algorithm 133B (FIG. 10) provides a calculation or control signal for providing the time Y by selecting or adjusting the delay Z of the element 148B in order to select or adjust the FSR and the constructive and destructive transfer functions $G(f)$ and $H(f)$ (FIG. 2) for the DLI 150B.

The material for the element 146B is selected to have an optical index that depends upon temperature. The FSR phase controller 137B provides a control signal to adjust the temperature of the oven 174B in order to fine tune the delay of the element 146B for centering the constructive and destructive transfer functions $G(f)$ and $H(f)$ (FIG. 2) of the DLI 150B on the optical carrier frequency of the input optical signal 24.

Figure 6C:
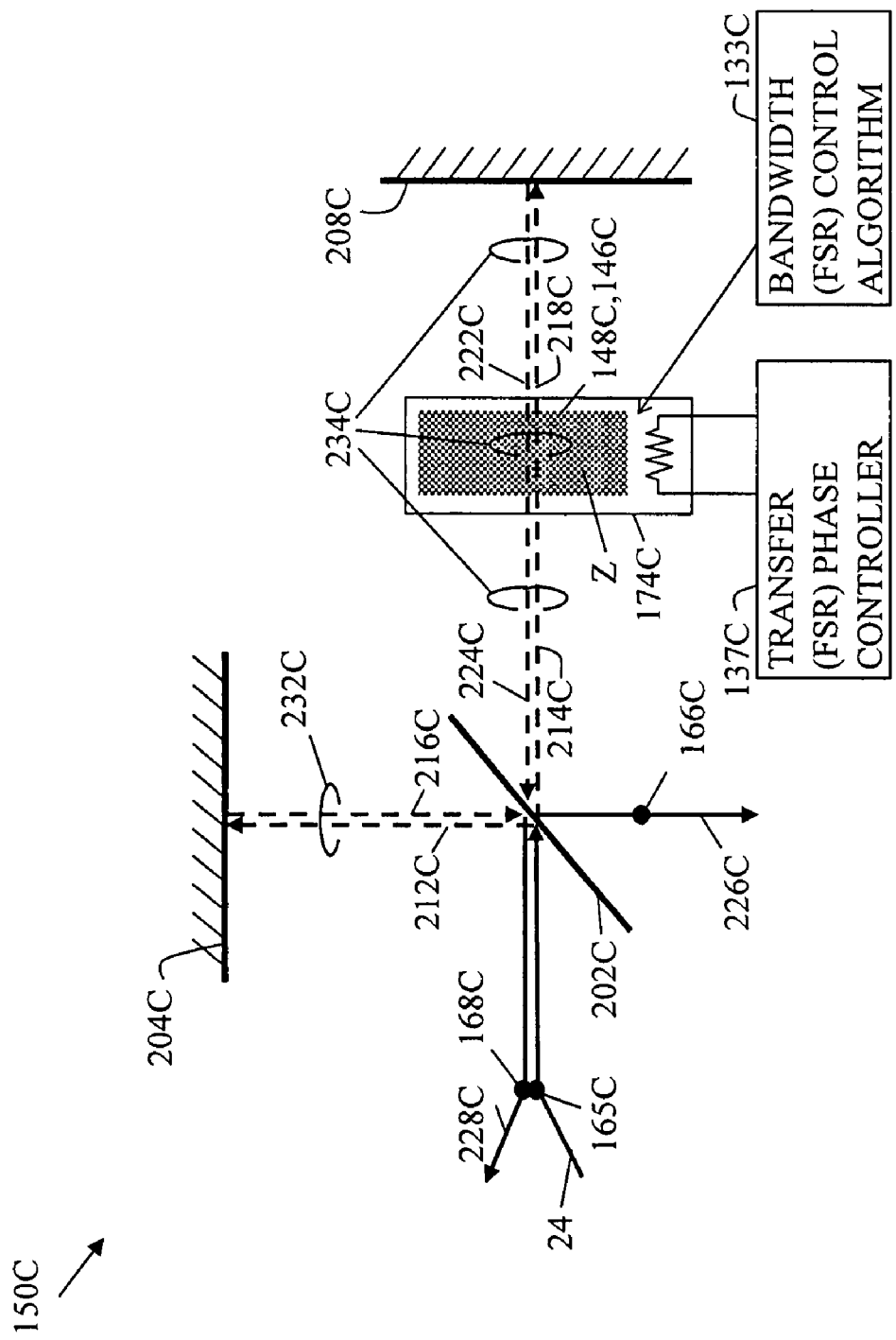

FIG. 6C illustrates a delay line interferometer (DLI) 150C as an embodiment of the DLI 150. Elements associated with the DLI 150C that are analogous to elements associated with the DLI 150 are denoted by appending the reference identification numbers by the letter "C". The DLI 150C includes structural elements for an input port 165C, a combined transfer FSR bandwidth element and phase element 148C, 146C, a mechanism or oven 174C, a partially reflecting first mirror 202C, a second mirror 204C, a third mirror 208C, and constructive and destructive output ports 166C and 168C.

The structural elements of DLI 150C are disposed as follows. The input optical signal 24 illuminates the front side of the partially reflecting first mirror 202C. The first mirror 202C is set at an angle to the path of the optical signal 24 so that part of the signal 24 is reflected as a signal 212C and part of the signal 24 is passed through as a signal 214C. The signal 212C is reflected from the second mirror 204C as a signal 216C back to the front side of the first mirror 202C. The signal 214C illuminates the element 148C, 146C and emerges after the delay Z and an adjustment by the fine tune phase delay as a signal 218C. The signal 218C reflects from the third mirror 208C as a signal 222C.

The signal 222C illuminates the element 148C, 146C and emerges after the delay Z and an adjustment by the phase delay as a signal 224C. The signal 224C illuminates the back side of the first mirror 202C. Part of the signal 224C is reflected from the back side of the first mirror 202C to combine with part of the signal 216C passed through the front side of the first mirror 202C for providing a signal 226C at the constructive output port 166C. Part of the signal 224C passes through the back side of the first mirror 202C to combine with part of the signal 216C reflected from the front side of the first mirror 202C for providing a signal 228C at the destructive output port 168C.

The elements of the DLI 150C split the input signal 24 into a first path 232C and a second path 234C. The transit time of the first path 232C is the sum of the transit times of the signals 212C and 216C. The transit time of the second path 234C is the sum of the transit times of the signals 214C, 218C, 222C and 224C plus two times the delay Z with the adjustment of the phase delay of the element 148C, 146C. The difference between the first and second path transit times is the differential transit time Y that is used for demodulation of the input optical signal 24. A bandwidth (FSR) control algorithm 133C (FIG. 10) provides a calculation or control signal for providing the time Y by selecting or adjusting the delay Z of the element 148C, 146C in order to select or adjust the FSR and the constructive and destructive transfer functions G($f$) and H($f$) (FIG. 2) for the DLI 150C.

The material for the element 148C, 146C is selected to have an optical index that depends upon temperature. The FSR phase controller 137C provides a control signal to adjust the temperature of the oven 174C in order to fine tune the phase delay of the element 146C for centering the constructive and destructive transfer functions G($f$) and H($f$) (FIG. 2) of the DLI 150C on the optical carrier frequency of the input optical signal 24.

Figure 7:
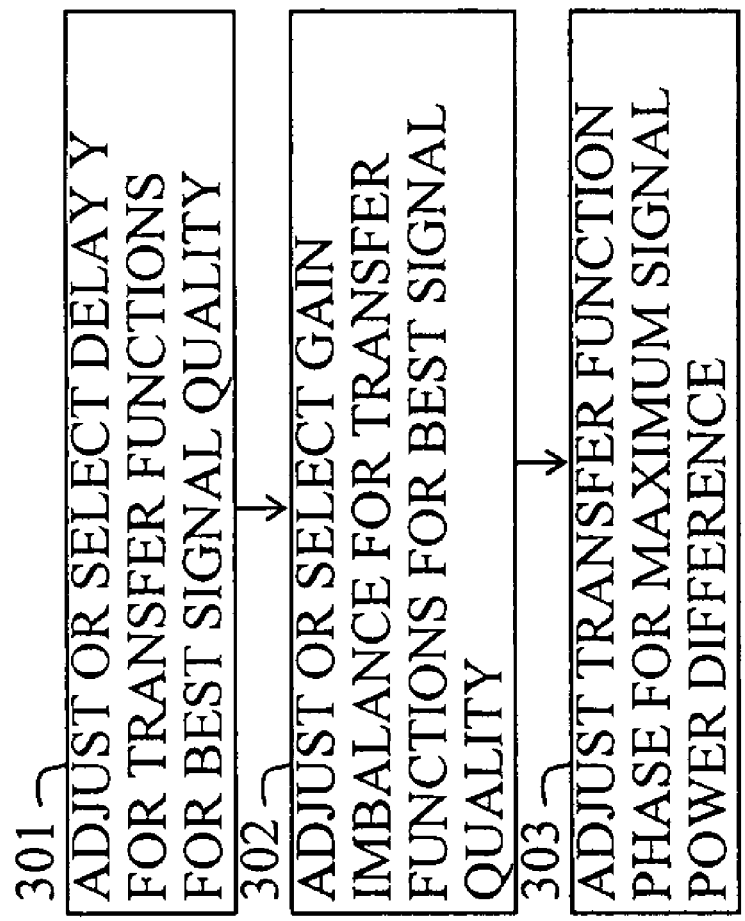
FIG. 7 is a simplified flow chart of a method of the present invention for receiving a modulated optical signal.

FIG. 7 is a simplified flow chart of a method of the present invention for receiving a differential phase shift keyed (DPSK) optical signal transmitted through a transmission link channel. One or any combination of these steps may be stored on a tangible medium 300 in a computer-readable form as instructions to a computer for carrying out the steps.

In a step 301 constructive and destructive transfer functions are calculated, looked up in a table based on calculations, or actively tuned for minimizing the effect of intersymbol interference (ISI) for improving signal quality. The transfer functions may be implemented by selecting a delay Z in a signal path of a delay line interferometer (DLI) in order to select the free spectral range (FSR) of the DLI. The delay Z contributes to a differential time Y, in general not equal to a DPSK symbol time T, for providing differential demodulation. The signal quality may be determined in terms of bit error ratio (BER) for output data. In a first embodiment the delay Z is selected by dynamically adjusted with feedback from a signal quality measurement in order to minimize the BER. In a second embodiment the delay Z is selected by trial and error in order to minimize a measured BER. In a third embodiment the delay Z is selected based upon a BER measurement on another optical transmission link channel where the other channel is known to have the same channel bandwidth. In a fourth embodiment the delay Z is selected by calculating from a known channel or spectrum bandwidth. In a fifth embodiment the delay Z is selected from a table having calculations based on channel bandwidth or spectrum for minimizing BER. The calculations for FSR are shown in the chart of FIG. 10. Signal quality analysis and measurements other than BER, such as measurements of eye openings, may be used in place of, or to augment BER detection for the selection, adjustment or control of the delay Z. The user should be aware that the receiver 20 may lose lock on the input signal 24 when a new FSR delay Z is selected.

Figure 11:
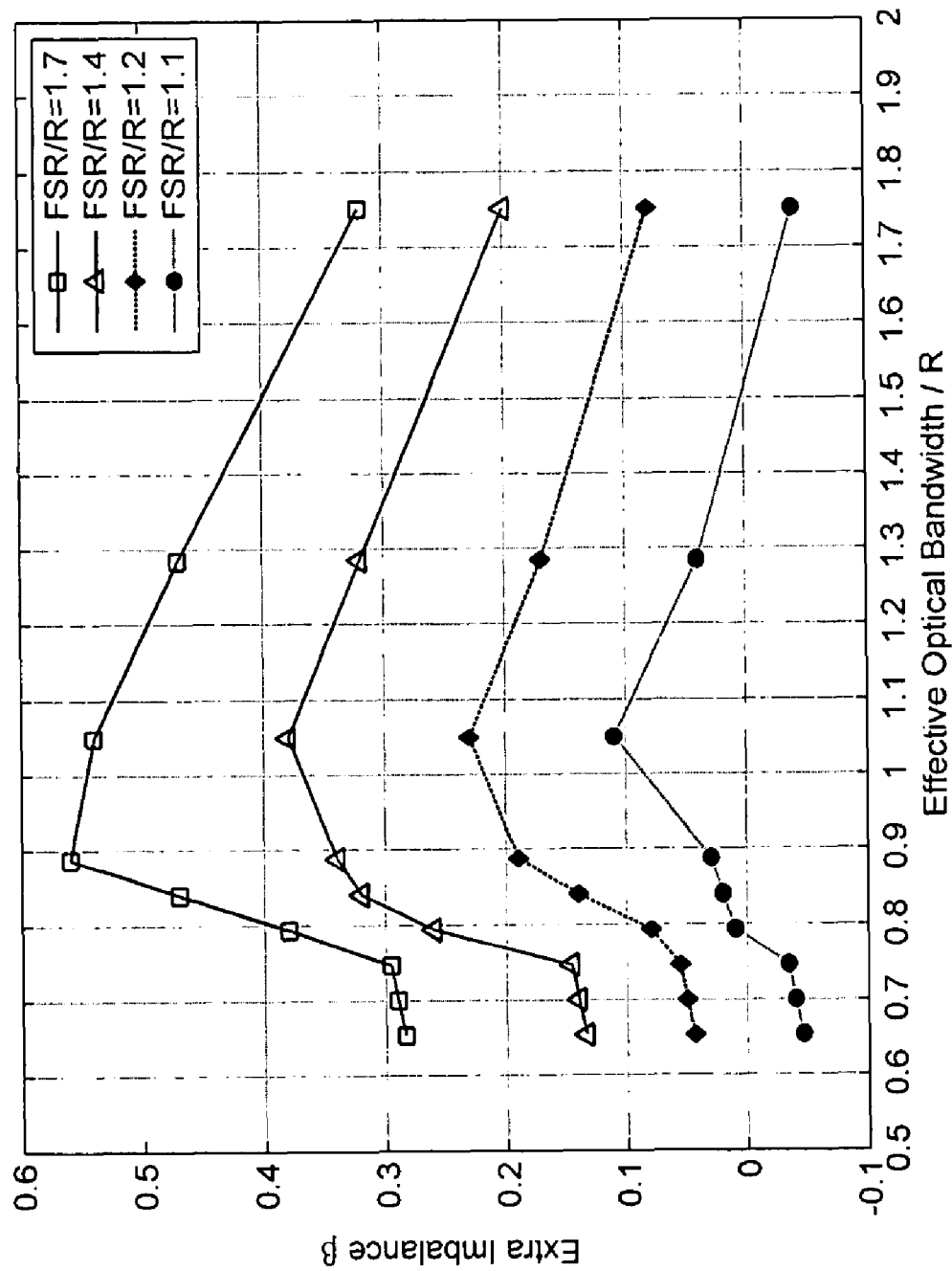
FIG. 11 is a chart showing a calculation of gain imbalance based on system bandwidth and FSR in order to compensate for the ISI in the system of FIG. 3.

In a step 302 an optical gain imbalance between constructive and destructive output port signals is selected (as described above for the FSR delay Z) for best signal quality. The calculations for gain imbalance are shown in FIG. 11. The signal quality may be determined as described above.

In a step 303 the phase of the constructive and destructive transfer functions is adjusted for maximizing the signal power difference between optical constructive and destructive path signals. The transfer function phases may be adjusted as FSR phases while the system is in operation for providing output data without overly degrading the output data by fine tuning the delay of a signal delay element in a signal path in the DLI. Optionally, the FSR phase is further tuned for best signal quality. The FSR phase adjustment tunes the constructive and destructive transfer functions relative to the carrier frequency of the input optical signal.

Figure 8:
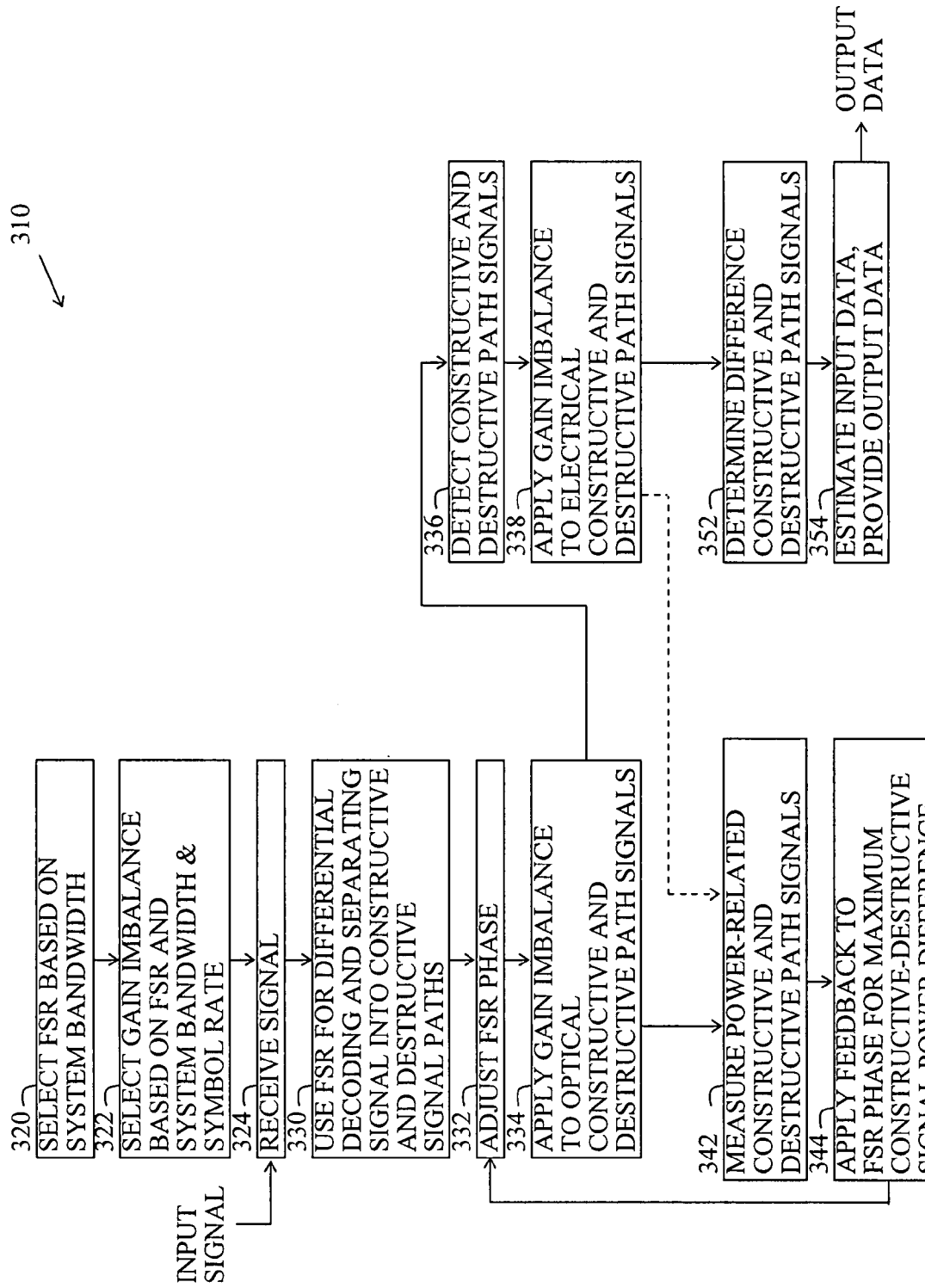
FIG. 8 is a flow chart of a method of the present invention using a calculated FSR and a calculated gain imbalance.

FIG. 8 is a flow chart of a method of the present invention using a calculated FSR and a calculated gain imbalance for receiving a differential phase shift keyed (DPSK) optical signal transmitted through a transmission link channel. Any one or more of these steps may be stored on a tangible medium 310 in a computer-readable form as instructions that may be read by a computer for carrying out the steps. The reader may refer to the descriptions of the system 10 and optical receivers 20 and 120 for further details of the following steps.

Either during design, test or installation in a step 320 a free spectral range (FSR) of a delay line interferometer (DLI) is calculated based on characteristics, particularly the bandwidth of the link 16, for the transmission system 10 for obtaining the best signal quality and/or lowest bit error ratio (BER). In a step 322 optical and/or electrical gain imbalances are calculated based on the FSR of the DLI, the symbol rate R, and the characteristics of the transmission system 10, particularly the bandwidth of the filters 26, for obtaining the best signal quality and/or lowest bit error ratio (BER).

In operation the receiver 20, 120 receives the modulated input signal 24 in a step 324. In a step 330 the DLI having the pre-calculated FSR differentially decodes the signal 24 and uses optical interference for separating the signal into constructive and destructive signal paths. In a step 332 the FSR phase is adjusted for tuning the FSR transfer functions relative to the carrier of the signal 24. In a step 334 the optical gain imbalance is applied to the signals in the constructive and destructive signal paths for providing optical constructive and destructive signal outputs.

The modulations of the signals at the optical constructive and destructive signal outputs are converted to electrical signals in a step 336. In a step 338 the electrical gain imbalance is applied to the signals in the constructive and destructive signal paths for providing electrical constructive and destructive signal outputs.

Power-related measurements are detected in a step 342 for the signals at the constructive and destructive signal outputs. When the gain imbalance is applied to the electrical signals, the electrical output signals are measured. When the gain imbalance is applied to the optical signals but not the electrical signals, either the optical or the electrical output signals may be measured. In one embodiment, the gain is applied to the optical signals and the power-related detections are measurements of the average photocurrents for converting the optical modulation to electrical signals. In a step 344 a normalized difference between the power-related measurements is applied to adjust the FSR phase for the step 332. In a step 352 the electrical constructive and destructive path signals are combined by taking the difference of the signals. The difference is issued as a baseband signal. Finally, in a step 354 the input data from the transmitter 12 is estimated from the baseband signal for providing output data.

Figure 9:
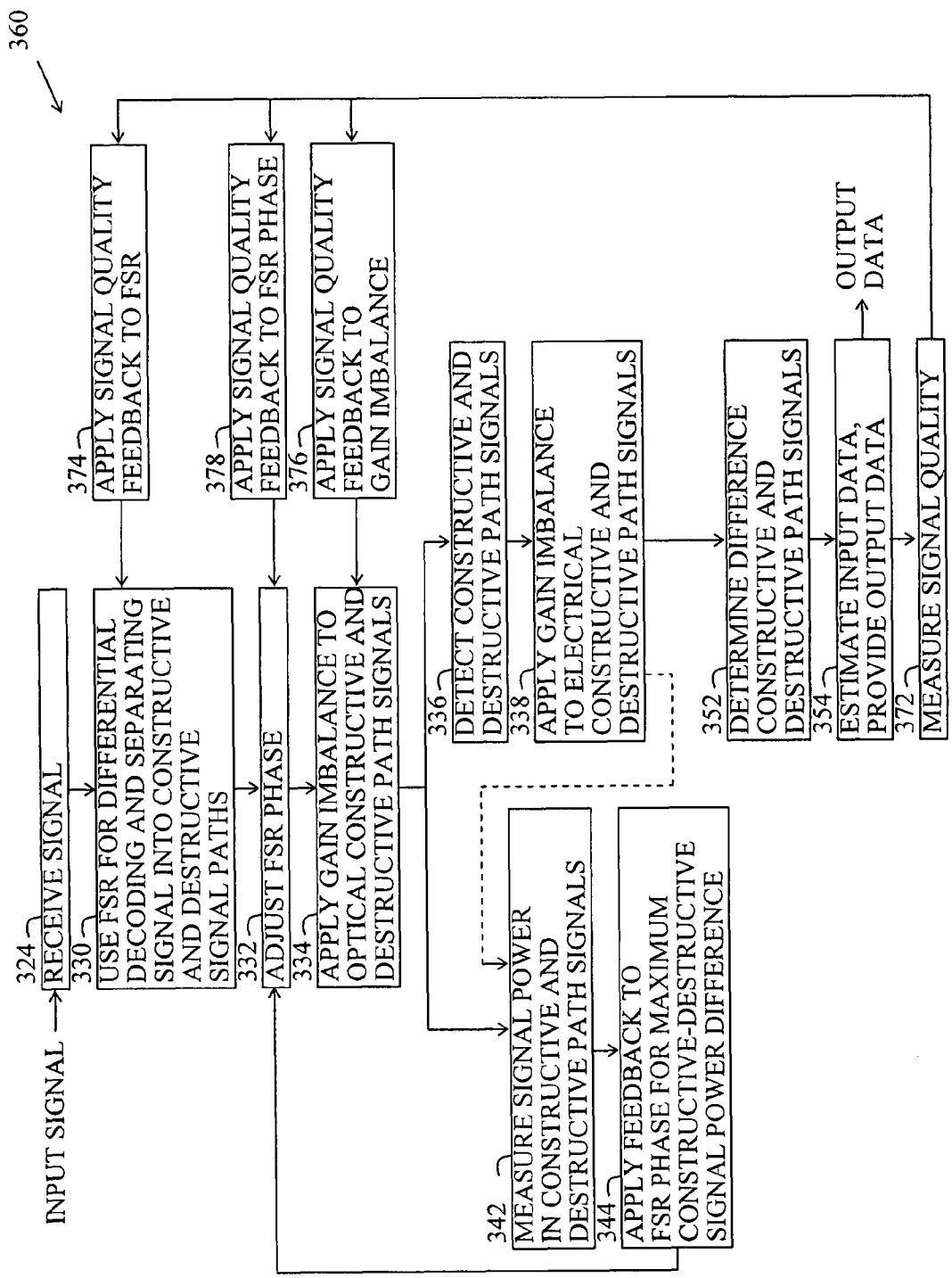
FIG. 9 is a flow chart of a method of the present invention where the FSR and the gain imbalance are adjusted for best signal quality.

FIG. 9 is a flow chart of a dynamic method of the present invention where the FSR and the gain imbalance are adjusted according to BER for receiving a differential phase shift keyed (DPSK) optical signal transmitted through a transmission link channel while attempts are being made for transmitting data through the system 10. Any one or more of these steps may be stored on a tangible medium 360 in a computer-readable form as instructions that may be read by a computer for carrying out the steps. The reader may refer to the descriptions of the system 10 and optical receivers 20 and 120 for further details of the following steps. It should be noted that the data may require several re-transmissions as the receiver 20, 120 is being adjusted.

The input signal 24 is received at the start in the step 324. In the step 330 the DLI differentially decodes the signal 24 and uses optical interference for separating the signal into constructive and destructive signal paths. In the step 332 the FSR phase is adjusted for tuning the FSR transfer functions relative to the carrier of the signal 24. For a symmetrical signal spectrum, the FSR phase is tuned for centering the FSR transfer functions to the carrier of the signal 24. In the step 334 the optical gain imbalance is applied to the signals in the constructive and destructive signal paths for providing optical constructive and destructive signal outputs.

The modulations of the signals at the optical constructive and destructive signal outputs are converted to electrical signals in the step 336. In the step 338 the electrical gain imbalance is applied to the signals in the constructive and destructive signal paths for providing electrical constructive and destructive signal outputs.

Power-related measurements are detected in the step 342 for the signals at the constructive and destructive signal outputs. When the gain imbalance is applied to the electrical signals, the electrical output signals are measured. When gain imbalance is applied to the optical signals but not the electrical signals, either the optical or the electrical output signals may be measured. In one embodiment, the gain is applied to the optical signals and the power-related detections are measurements of the average photocurrents for converting the optical modulation to electrical signals. In the step 344 a normalized difference between the power-related measurements is applied to adjust the FSR phase for the step 332. In a step 352 the electrical constructive and destructive path signals are combined by taking the difference of the signals. The difference is issued as a baseband signal.

The difference of the constructive and destructive electrical signal outputs is determined in the step 352 for providing a baseband signal. In the step 354 the input data from the transmitter 12 is estimated from the baseband signal for providing output data.

A signal quality determined from the optical or electrical signals, or a bit error ratio (BER) is measured for the output data in a step 372. In a step 374, feedback for the signal quality or BER is applied to adjust the FSR used in the step 330. In a step 376 feedback for the signal quality is applied to adjust the optical and/or gain imbalance for the step 334. And optionally, in a step 378 feedback for the signal quality is applied to adjust the FSR phase for the step 332. The steps 330, 332 and/or 334 may be iterated until no further improvement in signal quality is detected. Whenever the FSR is changed due to a new selection or adjustment in the step 330, the FSR phase must be re-tuned in the step 332.

FIG. 10 is an exemplary chart for the bandwidth (FSR) control algorithms 33 and 133 for calculating the optimum FSR for the DLI 150 (FIGS. 4, 5 and 6A-C) based on the effective optical bandwidth of the system 10. The FSR and the bandwidth are normalized to the symbol rate R (the inverse of the symbol time T) of the system 10. It can be seen that the optimum FSR is at least 10% greater than the symbol rate R. It can also be seen that the optimum FSR is at least 20% greater than the symbol rate R when the effective optical bandwidth of the system 10 is less than the symbol rate R. It should be noted that the FSR/R levels of 1, 1.1, 1.2, 1.3, 1.4, 1.5, 1.6, 1.7, 1.8, 1.9 and 2 are provided by differential demodulation transit times of about 90.9%, 83.3%, 76.9%, 71.4%, 66.7%, 62.5%, 58.8%, 55.6%, 52.6% and 50%, respectively, of the symbol time T for the modulated optical input signal 24.

FIG. 11 is an exemplary chart for the gain imbalance control algorithms 64 and 164 for the calculating the extra gain imbalance to be applied by the optical imbalancer 152 and/or the electrical imbalancer 156. The gain imbalance term $\beta$ is calculated from the FSR for the DLI 150, the effective optical bandwidth of the system 10, and the symbol rate R of the system 10.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the present invention.

The invention claimed is:

1. An optical receiver comprising:
    a signal processor having constructive and destructive transfer functions for receiving a modulated optical input signal and issuing signals at constructive and destructive outputs, respectively, the signal processor including a delay line interferometer (DLI) having two signal paths having a transit time difference for differentially demodulating said modulated optical input signal, said transfer functions determined at least in part by a free spectral range (FSR) defined by said transit time difference;
    at least one transfer phase element disposed in the signal processor, the transfer phase element for providing a controllable transfer function phase for at least one of said transfer functions with respect to a frequency of said input signal, the transfer phase element being disposed in one of said signal paths for adjusting a signal phase of a signal traversing said signal path for adjusting said transfer function phase, the transfer phase element including an FSR element disposed in said DLI having a selected FSR delay for providing said transit time difference not equal to a symbol time for said modulated optical input signal; and
a transfer phase controller coupled to the transfer phase element for controlling said transfer function phase for maximizing a difference between signal powers for said constructive and destructive outputs.

2. The receiver of claim 1, wherein:
said difference between signal powers for said constructive and destructive outputs is a normalized difference including a difference between said signal powers divided by a sum of said signal powers.

3. The receiver of claim 1, wherein:
said signals at said constructive and destructive outputs are optical signals.

4. The receiver of claim 1, wherein:
said signals at said constructive and destructive outputs are electrical signals.

5. The receiver of claim 1, further comprising:
a signal quality feedback path for providing signal quality data to the transfer phase controller, said signal quality data derived from signals from said constructive and destructive outputs; and wherein:
the transfer phase controller is constructed for using said signal quality data for further controlling said transfer function phase for optimizing a signal quality.

6. The receiver of claim 1, further comprising:
a detector apparatus having a first photo-detector having a first photocurrent resulting from a conversion of an optical signal for said constructive output to a first electrical signal, and a second photo-detector having a second photocurrent resulting from a conversion of an optical signal for said destructive output to a second electrical signal; and wherein:
the transfer phase controller is constructed for using said first and second photocurrents for controlling said transfer function phase.

7. The receiver of claim 6, wherein:
the transfer phase controller is constructed for controlling said transfer function phase based on feedback from a normalized difference between said first and second photocurrents.

8. The receiver of claim 7, wherein:
said normalized difference is a difference between said first and second photocurrents divided by a sum of said first and second photocurrents.

9. The receiver of claim 1, wherein:
said DLI includes a partially reflecting first mirror, a second mirror and a third mirror; said first mirror disposed for splitting said input signal into first and second signals; said second mirror disposed for reflecting said first signal back to said first mirror; said third mirror disposed for reflecting said second signal back to said first mirror; the at least one transfer phase element disposed for delaying at least one of said first and second signals, respectively, for adjusting said transfer function phase; said first mirror passing a portion of said first signal and reflecting a portion of said second signal for said constructive output and reflecting a portion of said first signal and passing a portion of said second signal for said destructive output.

10. The receiver of claim 1, wherein the FSR delay is selected for providing said transit time difference less than a symbol time for said modulated optical input signal.

11. The receiver of claim 10, wherein:
said FSR delay is selected for providing said transit time difference less than about 90% of a symbol time for said modulated optical input signal.

12. The receiver of claim 11, wherein:
when an effective optical bandwidth of said modulated optical input signal is less than a symbol rate of said modulated optical input signal, said FSR delay is selected for providing said transit time difference less than about 83.3% of a symbol time for said modulated optical input signal.

13. The receiver of claim 10, wherein:
said FSR delay is selected for minimizing intersymbol interference (ISI) in said modulated optical input signal.

14. The receiver of claim 10, wherein:
said FSR delay is selected according to an optical bandwidth for said modulated optical input signal.

15. The receiver of claim 10, wherein:
said FSR delay is selected based on a signal quality measurement for a demodulated representation of said modulated optical input signal.

16. The receiver of claim 10, wherein:
said FSR delay is selected for providing a minimum bit error ratio (BER) for output data differentially demodulated with said transit time difference.

17. The receiver of claim 1, wherein:
the signal processor includes an optical imbalancer for providing a gain imbalance to optical signals passing through constructive and destructive signal paths to said constructive and destructive outputs, said transfer functions determined at least in part by said gain imbalance.

18. The receiver of claim 17, wherein:
the signal processor further includes a delay line interferometer (DLI) having a free spectral range (FSR), said transfer functions determined at least in part by said FSR; and
said gain imbalance is selected according to an effective optical bandwidth of said modulated optical input signal, a symbol rate of said modulated optical input signal, and said FSR for minimizing a bit error ratio for output data derived from said modulated optical input signal with said transfer functions.

19. The receiver of claim 1, further comprising:
a detector apparatus for converting optical signals to electrical signals for optical said constructive and destructive outputs, said electrical signals passing through electrical constructive and destructive signal paths to electrical said constructive and destructive outputs; and
a data estimator operating on a difference between said signals from said electrical constructive and destructive outputs for providing output data.

20. A method for receiving an optical signal, comprising:
applying constructive and destructive transfer functions to a modulated optical input signal for providing signals at constructive and destructive outputs, respectively, at least one of said transfer functions having a controllable transfer function phase, said applying the constructive and destructive transfer functions including:
differentially demodulating said input signal using a transit time difference between two signal paths in a delay line interferometer (DLI), said transfer functions determined at least in part by a free spectral range (FSR) defined by said transit time difference, said differentially demodulating said input signal comprising selecting an FSR delay for providing said transit time difference, said transit time difference not equal to a symbol time for said modulated optical input signal, and adjusting a signal phase of a signal traversing one of said signal paths for adjusting said transfer function phase; and controlling said transfer function phase with respect to a frequency of said optical signal for maximizing a difference between signal powers for said constructive and destructive outputs.

21. The method of claim 20, wherein:
said difference between signal powers for said constructive and destructive outputs is a normalized difference including a difference of said signal powers divided by a sum of said signal powers.

22. The method of claim 20, wherein:
said signals at said constructive and destructive outputs are optical signals.

23. The method of claim 20, wherein:
said signals at said constructive and destructive outputs are electrical signals.

24. The method of claim 20, further comprising:
deriving signal quality data from signals from said constructive and destructive outputs; and
using said signal quality data for further controlling said transfer function phase for optimizing a signal quality.

25. The method of claim 20, further comprising:
using a first photocurrent resulting from a conversion of an optical signal for said constructive output to a first electrical signal and using a second photocurrent resulting from a conversion of an optical signal for said destructive output to a second electrical signal; and wherein:
controlling said transfer function phase includes adjusting said transfer function phase based on said first and second photocurrents.

26. The method of claim 25, wherein:
controlling said transfer function phase includes adjusting said transfer function phase based on a normalized difference between said first and second photocurrents.

27. The method of claim 26, wherein:
said normalized difference is a difference between said first and second photocurrents divided by a sum of said first and second photocurrents.

28. The method of claim 20, wherein differentially demodulating said input signal includes:
separating said input signal into signals in first and second signal paths;
reflecting a first signal in said first signal path;
reflecting a second signal in said second signal path;
adjusting said transfer function phase by delaying at least one of said first and second signals;
passing a portion of said reflected first signal and reflecting a portion of said reflected second signal to said constructive output; and
reflecting a portion of said reflected first signal and passing a portion of said reflected second signal to said destructive output.

29. The method of claim 20, wherein:
the FSR delay is selected for providing said transit time difference less than a symbol time for said modulated optical input signal.

30. The method of claim 29, wherein:
said FSR delay is selected for providing said transit time difference less than about 90% of a symbol time for said modulated optical input signal.

31. The method of claim 30, wherein:
when an effective optical bandwidth of said modulated optical input signal is less than a symbol rate of said modulated optical input signal, said FSR delay is selected for providing said transit time difference less than about 83.3% of a symbol time for said modulated optical input signal.

32. The method of claim 29, wherein:
said FSR delay is selected for minimizing intersymbol interference (ISI) in said modulated optical input signal.

33. The method of claim 29, wherein:
said FSR delay is calculated according to an optical bandwidth for said modulated optical input signal.

34. The method of claim 29, wherein:
said FSR delay is selected based on a signal quality measurement for a demodulated representation of said modulated optical input signal.

35. The method of claim 29, wherein:
said FSR delay is selected for providing a minimum bit error ratio (BER) for output data differentially demodulated with said transit time difference.

36. The method of claim 20, wherein:
said transfer functions include an optical gain imbalance applied to said signals for said constructive and destructive outputs.

37. The method of claim 36, wherein:
said transfer functions further include a free spectral range (FSR) of a delay line interferometer (DLI), said DLI for separating said modulated optical input signal into signal paths for said constructive and destructive outputs; and further comprising:
selecting said gain imbalance based on an effective optical bandwidth of said modulated optical input signal, a symbol rate of said modulated optical input signal and said FSR for minimizing a bit error ratio for output data estimated from said modulated optical input signal with said transfer functions.

38. The method of claim 20, further comprising:
converting optical signals for optical said constructive and destructive outputs to electrical signals, said electrical signals passing through electrical constructive and destructive signal paths to electrical said constructive and destructive outputs; and
determining output data based on a difference between said signals for said electrical constructive and destructive outputs.

* * * * *